(12) United States Patent
Taguchi et al.

(10) Patent No.: US 8,384,998 B2
(45) Date of Patent: *Feb. 26, 2013

(54) ANTIREFLECTION FILM, DISPLAY DEVICE AND LIGHT TRANSMISSIVE MEMBER

(75) Inventors: Tokio Taguchi, Osaka (JP); Takao Imaoku, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/315,321

(22) Filed: Dec. 9, 2011

(65) Prior Publication Data

US 2012/0081793 A1 Apr. 5, 2012

Related U.S. Application Data

(62) Division of application No. 13/375,040, filed as application No. PCT/JP2010/058443 on May 19, 2010.

(30) Foreign Application Priority Data

Jun. 12, 2009 (JP) ................................ 2009-141130

(51) Int. Cl.
G02B 1/10 (2006.01)
G02B 27/00 (2006.01)
(52) U.S. Cl. ........................................ 359/581; 359/601
(58) Field of Classification Search .................. 359/581, 359/599, 601, 609
See application file for complete search history.

(56) References Cited

U.S. PATENT DOCUMENTS

| | | | |
|---|---|---|---|
| 4,190,321 A * | 2/1980 | Dorer et al. | .................... 359/581 |
| 5,084,649 A | 1/1992 | Sasao | |
| 6,359,735 B1 | 3/2002 | Gombert et al. | |
| 7,297,386 B2 * | 11/2007 | Suzuki et al. | .................. 428/141 |
| 2003/0180476 A1 | 9/2003 | Yamashita et al. | |
| 2003/0205475 A1 | 11/2003 | Sawitowski | |
| 2004/0163441 A1 | 8/2004 | Sawitowski | |
| 2004/0247800 A1 | 12/2004 | Yoshitake et al. | |
| 2007/0159698 A1 | 7/2007 | Taguchi et al. | |
| 2008/0304155 A1 | 12/2008 | Endoh et al. | |
| 2009/0110804 A1 | 4/2009 | Ogawa et al. | |
| 2009/0211912 A1 | 8/2009 | Taguchi et al. | |
| 2009/0246494 A1 | 10/2009 | Matsumoto | |
| 2009/0252825 A1 | 10/2009 | Taguchi et al. | |
| 2010/0328776 A1 | 12/2010 | Sanari et al. | |

FOREIGN PATENT DOCUMENTS

| | | |
|---|---|---|
| EP | 2 056 129 | 5/2009 |
| JP | 3-196451 | 8/1991 |
| JP | 11-281818 | 10/1999 |
| JP | 2001517319 A | 10/2001 |
| JP | 2003-84106 | 3/2003 |
| JP | 2003531962 A | 10/2003 |
| JP | 2004-059820 A | 2/2004 |
| JP | 2004-059822 A | 2/2004 |
| JP | 2005-258120 A | 9/2005 |
| JP | 2005-331607 | 12/2005 |
| JP | 2007-118449 A | 5/2007 |

(Continued)

*Primary Examiner* — Alessandro Amari
(74) *Attorney, Agent, or Firm* — Harness, Dickey & Pierce, P.L.C.

(57) ABSTRACT

An antireflection film is provided in which a light scattering property is suppressed. In at least one example embodiment, the antireflection film includes, on a surface thereof, a moth-eye structure including a plurality of convex portions such that a width between vertices of adjacent convex portions is no greater than a wavelength of visible light. In at least one example embodiment of this antireflection film, the moth-eye structure does not include a sticking structure formed when tip end portions of the convex portions are joined to each other.

29 Claims, 33 Drawing Sheets

FOREIGN PATENT DOCUMENTS

| | | |
|---|---|---|
| JP | 2007-187746 | 7/2007 |
| JP | 2007-240707 A | 9/2007 |
| JP | 2009-20355 | 1/2009 |
| JP | 2009-104103 | 5/2009 |
| WO | WO 2006/059686 | 6/2006 |
| WO | WO-2007040159 A1 | 4/2007 |

* cited by examiner

Refractive index

ANTIREFLECTION FILM, DISPLAY DEVICE AND LIGHT TRANSMISSIVE MEMBER

This application is a divisional application of U.S. application Ser. No. 13/375,040, filed Nov. 29, 2011, which is a National Stage of International Application No. PCT/JP2010/058443, filed May 19, 2010, which claims priority under 35 U.S.C. §119 to Japanese Patent Application No. 2009-141130, filed on Jun. 12, 2009, the contents of each of which are hereby incorporated by reference in their entirety.

TECHNICAL FIELD

The present invention relates to an antireflection film, a display device, and a light transmissive member. More specifically, the present invention relates to an antireflection film provided for use on a surface of a base, a display device including the antireflection film, and a light transmissive member including the antireflection film.

BACKGROUND ART

Various functions, such as an anti-scratch function, a function for preventing external light reflection, and an anti-soiling function, are required on a surface of a display such as a CRT (Cathode Ray Tube) display, an LCD (Liquid Crystal Display), a PDP (Plasma Display Panel), and an EL (Electroluminescence) display.

In an example of a method for providing a function for preventing external light reflection, LR (Low Reflection) treatment is implemented by providing a material having a different refractive index to that of a material constituting the display as a film on a surface of the display such that reflection is reduced by an interference effect between light reflected by the display surface and light reflected by the film surface.

However, reflection on an interface between air and the film surface and reflection on an interface between the film surface and the display surface typically deviate from ideal conditions in terms of respective amplitude reflectance values and phase values thereof. Hence, reflected light resulting from the reflection is not cancelled out completely, and as a result, a sufficient antireflection effect is not realized. Therefore, with LR treatment alone, peripheral light is reflected at a constant reflectance so that images from a light source such as a fluorescent lamp are reflected on a display, making the display extremely difficult to see. In response to this problem, AG (antiglare) treatment for preventing external light reflection using a light scattering effect is implemented additionally by forming a fine concave-convex pattern on the surface of the display so that images from a light source such as a fluorescent lamp are blurred by the scattered light.

In an example of a typical method for forming a fine concave-convex pattern, a relief hologram or a diffraction grating such as that applied to credit cards, ID cards, gift certificates, banknotes, and so on for security purposes, for example, is formed (see Patent Documents 1 and 2, for example). Patent Documents 1 and 2 describe a 2P (Photo Polymer) method in which a transparent backing such as a polyester film is coated with a liquid photo-curable resin composition to form a liquid photo-curable resin layer, a stamper having a fine concave-convex pattern is pressed onto the photo-curable resin layer, and in this condition, the photo-curable resin layer is hardened by emitting light from the backing side, whereupon the stamper is removed, and a method of coating a backing with a photo-curable resin composition that is highly viscous or solid at room temperature to form a liquid photo-curable resin layer, pressing a stamper onto the photo-curable resin layer, peeling away the photo-curable resin layer, and then hardening the photo-curable resin layer by emitting light thereon.

Incidentally, in recent years, moth-eye structures, with which a super antireflection effect can be obtained without using optical interference, have come to attention as a method of realizing low reflection on a display surface through means other than AG treatment. In a moth-eye structure, a finer concave-convex pattern than that used in the AG treatment, having intervals that are no greater than the wavelength of light (no greater than 380 nm, for example), is arranged continuously on the surface of an object to be subjected to antireflection treatment such that the refractive index on the interface between the outside (air) and the film surface varies quasi-continuously. Thus, substantially all light is transmitted irrespective of the refractive index interface, and as a result, light reflection on the surface of the object can be substantially eliminated (see Patent Documents 3 and 4, for example).

Patent Document 1: Japanese Patent Application Publication No. 2004-59820
Patent Document 2: Japanese Patent Application Publication No. 2004-59822
Patent Document 3: Published Japanese Translation of PCT Application No. 2001-517319
Patent Document 4: Published Japanese Translation of PCT Application No. 2003-531962

Following various investigations into antireflection films (also referred to hereafter as moth-eye films) having a moth-eye structure on a surface thereof, the present inventors found that, depending on constitutional materials and manufacturing conditions of the moth-eye films, light may be scattered on the moth-eye structure, and as a result, when the moth-eye film is adhered to a surface of a display device, for example, an image displayed by the display device may appear cloudy.

DISCLOSURE OF THE INVENTION

The present invention has been designed in consideration of the current circumstances described above, and an object thereof is to provide an antireflection film in which a light scattering property is suppressed.

Following various investigations into the structure of a moth-eye film that causes light scattering, the present inventors focused on a tip end part of each convex portion of the moth-eye film. The present inventors discovered that a sticking structure formed when the tip end parts of the convex portions stick to each other may be cited as a constitutional feature of a moth-eye film on which light is likely to be scattered. The present inventors thus discovered that light scattering is caused by the sticking structure.

Further, the present inventors found that this type of sticking structure can be made less likely to form by modifying the constitutional materials and manufacturing conditions of the moth-eye film. The present inventors thus solved the problem described above with great success, thereby arriving at the present invention.

More specifically, the present invention is an antireflection film (also referred to hereafter as a first antireflection film according to the present invention) comprising, on a surface thereof, a moth-eye structure including a plurality of convex portions such that a width between vertices of adjacent convex portions is no greater than a wavelength of visible light. In this antireflection film, the moth-eye structure does not include a sticking structure formed when tip end portions of the convex portions are joined to each other.

Further, the present invention is an antireflection film (also referred to hereafter as a second antireflection film according to the present invention) comprising, on a surface thereof, a moth-eye structure including a plurality of convex portions such that a width between vertices of adjacent convex portions is no greater than a wavelength of visible light. In this antireflection film, the moth-eye structure includes a sticking structure formed when tip end portions of the convex portions are joined to each other, and a diameter of the sticking structure is smaller than 0.3 µm.

Furthermore, the present invention is an antireflection film (also referred to hereafter as a third antireflection film according to the present invention) comprising, on a surface thereof, a moth-eye structure including a plurality of convex portions such that a width between vertices of adjacent convex portions is no greater than a wavelength of visible light. In this antireflection film, the moth-eye structure includes a sticking structure formed when tip end portions of the convex portions are joined to each other, a diameter of the sticking structure is equal to or greater than 0.3 µm, and a density of the number of sticking structures relative to a planar area of the antireflection film is lower than 2.1 units/µm$^2$.

The first to third antireflection films of the present invention comprise, on their respective surfaces, a moth-eye structure including a plurality of convex portions, wherein the width (interval or pitch) between the vertices of adjacent convex portions is no greater than the wavelength of visible light. In this specification, "no greater than the wavelength of visible light" means no greater than 380 nm, which is a lower limit of a typical visible light wavelength band. The width is preferably no greater than 300 nm, and more preferably no greater than approximately half the wavelength of visible light, i.e. 200 nm. When the width of the moth-eye structure exceeds 400 nm, a tint may be formed by a blue wavelength component, but by setting the width at or below 300 nm, this effect can be suppressed sufficiently, and by setting the width at or below 200 nm, this effect can be substantially eliminated.

In the first antireflection film according to the present invention, the moth-eye structure does not include the sticking structure formed when the tip end portions of the convex portions are joined to each other. In other words, the density of the number of sticking structures relative to the planar area of the antireflection film in the first antireflection film according to the present invention can be said to be lower than 0 units/µm$^2$. The sticking structure causes light incident on the antireflection film to scatter more easily such that when the antireflection film is applied to a display device, for example, cloudiness is more likely to appear on a display.

In this specification, the sticking structure is a bundle of convex portions formed when the tip end portions of the convex portions bend so as to be joined to each other. More specifically, the sticking structure may be an integrated body including entire convex portions rather than merely the tip end portions thereof, and a hollow body formed when only the tip end portions are joined to each other. There are no particular limitations on the number of convex portions constituting one sticking structure. When a surface of the antireflection film is seen from above, the sticking structure may take a circular shape, an elliptical shape, a polygonal shape, a star shape, a flower shape, an amorphous shape, and so on. When the convex portions have a regular structure, the sticking structure is likely to take a star shape, a calabash shape, a flower shape, or an amorphous shape.

In the second antireflection film according to the present invention, the moth-eye structure includes the sticking structure formed when the tip end portions of the convex portions are joined to each other, and the diameter of the sticking structure is smaller than 0.3 µm, and preferably smaller than 0.2 µm. When the diameter of each sticking structure is smaller than 0.3 µm and preferably smaller than 0.2 µm, the light incident on the antireflection film is substantially not scattered. Therefore, by limiting the diameter of the sticking structure to this range, cloudiness is unlikely to occur on a display when the antireflection film is applied to a display device, for example. The reason for this is that in a convex portion structure smaller than this size, the size (pitch) is sufficiently smaller than the wavelength of visible light, and therefore a sufficient antireflection effect is obtained from the moth-eye and the effects of scattering are sufficiently suppressed. Note that the "diameter of the sticking structure" according to this specification denotes a width of a longest part of the sticking structure when the surface of the antireflection film is seen from above.

In the third antireflection film according to the present invention, the moth-eye structure includes the sticking structure formed when the tip end portions of the convex portions are joined to each other, the diameter of the sticking structure is equal to or greater than 0.3 µm, and the density of the number of sticking structures relative to the planar area of the antireflection film is lower than 2.1 units/µm$^2$. As long as a ratio of an area occupied by the sticking structures to a fixed surface area is low, a light scattering characteristic can be made substantially negligible even when the diameter of the sticking structure is equal to or greater than 0.3 µm. Therefore, by limiting a range of an area occupied by the sticking structures to a fixed surface area, cloudiness is unlikely to occur on a display when the antireflection film is applied to a display device, for example.

The configuration of the first to the third antireflection films of the present invention is not especially limited by other components as long as it essentially includes such components.

Preferable embodiments of the first to the third antireflection films of the present invention are mentioned in more detail below.

An aspect ratio of each of the plurality of convex portions is preferably smaller than 1.0. Further, a height of each of the plurality of convex portions is preferably smaller than 200 nm. In this specification, the aspect ratio is a ratio of the height of each convex portion relative to a bottom length. In other words, a value obtained by dividing the height by the bottom length (the value of height/bottom length) corresponds to the aspect ratio. By limiting the aspect ratio or the height of each convex portion to these ranges, the tip end portions of the convex portions become less likely to bend, and therefore sticking structure generation can be avoided. Note that here, the term "convex portion" is used to mean the convex portions not constituting the sticking structure.

An aspect ratio of each of the plurality of convex portions is preferably equal to or greater than 0.8. Further, a height of each of the plurality of convex portions is preferably equal to or greater than 160 nm. When the aspect ratio or the height of each convex portion is too low, light on a long wavelength side (yellow to red) may be reflected. Hence, by adjusting the aspect ratio of each convex portion to this range, an even display exhibiting little tint can be obtained when the antireflection film is applied to a display device, for example.

A local maximum value on a curve representing a temperature dependency characteristic of tan δ of a material forming the antireflection film is preferably no greater than 0.4, and more preferably no greater than 0.3. Further, an aspect ratio of each of the plurality of convex portions at this time is preferably no smaller than 0.7 and no greater than 1.1, and particularly effective when no smaller than 0.9 and no greater than 1.1. Furthermore, a height of each of the plurality of convex portions at this time is preferably no smaller than 140 nm and no greater than 220 nm, and particularly effective when no smaller than 180 nm and no greater than 220 nm. By limiting the local maximum value of tan δ of the material forming the antireflection film to this range, variation in the shape of the convex portions is unlikely to occur. Accordingly, the tip end portions of the convex portions become less likely to bend, and therefore sticking structure generation can be avoided. According to this structure, variation in the shape of the convex portions can be suppressed even when the aspect ratio of each convex portion is equal to or greater than 0.9, at which the tip end portion of the convex portion bends easily. Further, variation in the shape of the convex portions can be suppressed even when the height of each convex portion is equal to or greater than 180 nm.

A half width of a local maximum value on a curve representing a temperature dependency characteristic of tan δ of a material forming the antireflection film is preferably no smaller than 52° C., and more preferably no smaller than 92° C. Further, an aspect ratio of each of the plurality of convex portions at this time is preferably no smaller than 0.7 and no greater than 1.1, and particularly effective when no smaller than 0.9 and no greater than 1.1. Furthermore, a height of each of the plurality of convex portions at this time is preferably no smaller than 140 nm and no greater than 220 nm, and particularly effective when no smaller than 180 nm and no greater than 220 nm. By keeping the half width of the local maximum value of tan δ of the material forming the antireflection film within this range, variation in the shape of the convex portions is unlikely to occur. Accordingly, the tip end portions of the convex portions become less likely to bend, and therefore sticking structure generation can be avoided. According to this structure, variation in the shape of the convex portions can be suppressed even when the aspect ratio of each convex portion is equal to or greater than 0.9, at which the tip end portion of the convex portion bends easily. Further, variation in the shape of the convex portions can be suppressed even when the height of each convex portion is equal to or greater than 180 nm.

A differential coefficient of a curve representing a temperature dependency characteristic of a storage elastic modulus of a material forming the antireflection film is preferably no smaller than $-1.0 \times 10^{-8}$ and more preferably no smaller than $-0.8 \times 10^{-8}$ within a range extending from a variation start point to a variation end point. Further, a differential coefficient of a temperature dependency characteristic of a storage elastic modulus of a material forming the antireflection film is preferably no greater than $1.0 \times 10^{-8}$ and more preferably no greater than $0.8 \times 10^{-8}$ within a range extending from a variation start point to a variation end point. Furthermore, an aspect ratio of each of the plurality of convex portions at this time is preferably no smaller than 0.7 and no greater than 1.1, and particularly effective when no smaller than 0.9 and no greater than 1.1. Moreover, a height of each of the plurality of convex portions at this time is preferably no smaller than 140 nm and no greater than 220 nm, and particularly effective when no smaller than 180 nm and no greater than 220 nm. By setting the differential coefficient within a range extending from a start point to an end point of variation in the storage elastic modulus, which affects a dynamic viscoelasticity of the material forming the antireflection film, in the vicinity of zero, or in other words by making an incline of a storage elastic modulus curve based on a temperature dependency characteristic gentle, variation in the shape of the convex portions is unlikely to occur. Accordingly, the tip end portions of the convex portions become less likely to bend, and therefore sticking structure generation can be avoided. According to this structure, variation in the shape of the convex portions can be suppressed even when the aspect ratio of each convex portion is equal to or greater than 0.9, at which the tip end portion of the convex portion bends easily. Further, variation in the shape of the convex portions can be suppressed even when the height of each convex portion is equal to or greater than 180 nm.

A resin film used as the antireflection film normally possesses dynamic viscoelasticity. The dynamic viscoelasticity of the resin is temperature-dependent, and therefore property values such as a storage elastic modulus (E') and a loss elastic modulus (E") vary according to the temperature. The value of tan δ, which is calculated from loss elastic modulus (E")/storage elastic modulus (E'), is used as a parameter representing a resin characteristic.

These resin properties may be specified by measuring the dynamic viscoelasticity, for example. By measuring the dynamic viscoelasticity, data indicating temperature variation in the storage elastic modulus (E'), the loss elastic modulus (E"), and tan δ can be obtained for each measurement frequency. Further, by measuring the dynamic viscoelasticity, the occurrence of glass transition depending on an intramolecular structure and a temperature at which the glass transition occurs (a glass transition temperature) can be specified. In a typical resin, a reduction in E' and peaks of E" and tan δ are observed on either side of the glass transition temperature (Tg).

Note, however, that glass transition in a resin (a polymer) is a relaxation phenomenon that is dependent on a factor of time, and therefore variation indicating a glass transition exhibits a temperature shift according to the measurement frequency such that a transition region shifts to a higher temperature side as the frequency increases.

Hence, in this specification, the dynamic storage elastic modulus (E') and the dynamic loss elastic modulus (E") are values obtained by measuring the temperature dependency (temperature dispersion) using a method conforming to JIS K-7244 under the following conditions: sample dynamic amplitude velocity (drive frequency) 1 Hz; tensile mode; inter-chuck distance 5 mm; strain amplitude 10 μm; force amplitude initial value 100 mN; and temperature increase rate 2° C./min.

A glass transition temperature (Tg) of the material forming the antireflection film is preferably equal to or lower than 200° C., and more preferably equal to or lower than 100° C. Further, the glass transition temperature (Tg) of the material forming the antireflection film is preferably equal to or higher than 0° C. In this specification, the glass transition temperature (Tg) is a temperature at which tan δ reaches a local maximum, obtained by measuring the temperature dependency (temperature dispersion) using a method conforming to JIS K-7244 under the following conditions: sample dynamic amplitude velocity (drive frequency) 1 Hz; tensile mode; inter-chuck distance 5 mm; and temperature increase rate 2° C./min.

The antireflection film according to the present invention may be formed using a method of pressing a mold having a plurality of concave portions, with a width between vertices of adjacent concave portions of no greater than the wavelength of visible light, onto a surface of a resin film serving as the antireflection film, hardening the resin film using light or heat, and then removing the mold. However, when a resin having a glass transition temperature (Tg) exceeding 200° C. is used, a rigidity of the resin increases. Therefore, when forming a moth-eye structure constituted by convex portions having a high aspect ratio (specifically, 2.0 or higher), it is difficult to remove the mold, and as a result, the hardened resin film or the mold may break (become clogged). Further, when a resin in which Tg exceeds 100° C. is used, the resin film is likely to contract during hardening. In particular, when the resin film is formed on a film substrate made of PET (polyethylene terephthalate), TAC (triacetyl cellulose), COP (cyclo olefin polymer), or the like, the film substrate is likely to curl and an interface between the resin film and the film substrate is likely to distort, leading to a reduction in adherence and an increase in the likelihood of damage to the film substrate. Further, when a resin in which Tg exceeds 100° C. is used, the resin film tends to increase in brittleness, leading to an increase in the likelihood of cracks in the resin film.

The storage elastic modulus (E') is preferably no smaller than 0.1 GPa at 25° C. By keeping the storage elastic modulus of the material forming the antireflection film within this range, stability over time in the shape of the antireflection film and shock resistance can be improved in an actual usage environment of the antireflection film.

The first to third antireflection films of the present invention, when employed in a display device in particular, provide a display on which cloudiness caused by reflection is not perceived by a viewer. In other words, the present invention is also a display device including any of the first to third antireflection films according to the present invention. Note that the display device according to the present invention may be a liquid crystal display device, an organic electroluminescence display device, an inorganic electroluminescence display device, a plasma display device, a cathode ray tube display device, and so on. The antireflection film according to the present invention may also be used favorably in a light transmissive member (an optical member) used by a person to view a target object through the member. Hence, when the antireflection film is adhered to a transparent object such as a lens, a windowpane, a display window, an aquarium, or a front surface protective plate of a display device, for example, a low reflection effect, or in other words a high transmission effect, is obtained without generating cloudiness, and as a result, a clear, high-visibility display member can be realized. In other words, the present invention is also a light transmissive member including any of the first to third antireflection films according to the present invention.

EFFECT OF THE INVENTION

With the antireflection film according to the present invention, scattering of light incident on the antireflection film can be suppressed such that cloudiness is less likely to occur on a display when the antireflection film is disposed on a surface of a display device or an optical member.

MODES FOR CARRYING OUT THE INVENTION

Figure 1:
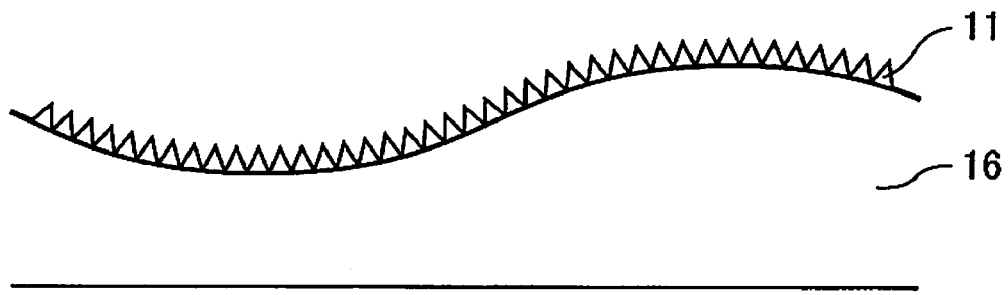
FIG. 1 is a sectional schematic view showing the entirety of a moth-eye film (antireflection film) according to a first embodiment.

The present invention will be mentioned in more detail referring to the drawings in the following embodiments, but is not limited to these embodiments.

First Embodiment

Figure 2:
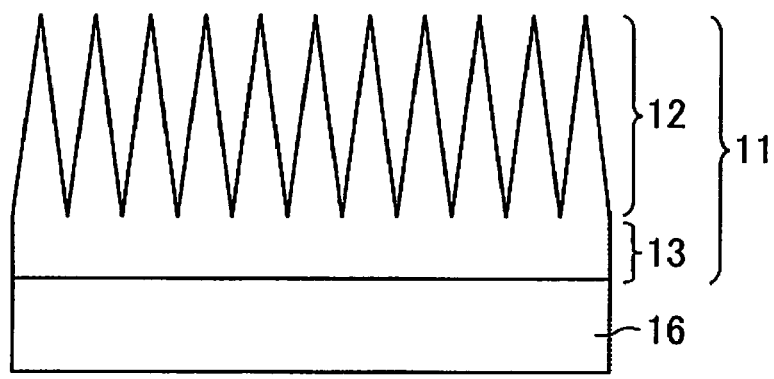
FIG. 2 is a sectional schematic view showing an enlargement of convex portions of the moth-eye film (antireflection film) according to the first embodiment.

FIGS. 1 and 2 are sectional schematic views showing a moth-eye film (antireflection film) according to a first embodiment. FIG. 1 shows the entire moth-eye film, and FIG. 2 shows an enlargement of convex portions. As shown in FIGS. 1 and 2, a moth-eye film 11 according to the first embodiment is provided on a base 16 which is the target of an antireflection treatment. There are no particular limitations on the material of the base 16 as long as respective antireflection films can be carried thereon. The base 16 may be either translucent or opaque. In the case that the base is an opaque base, a reflection prevention effect on the surface of the opaque base is realized. For example, in the case of a black base, a jet black appearance is obtained, and in the case of a colored base, an appearance having a high purity of color is obtained. Thus, a product having a superior design property is obtained. There are no particular limitations on the shape of the base 16, and, for example, a film, a sheet, an injection molded product, a fused molded product such as a press-molded product, or the like may be used. Materials that may be employed when the base 16 is translucent include glass, a plastic such as TAC (triacetyl cellulose), polyethylene, ethylene/propylene copolymer, PET (polyethylene terephthalate), acrylic resin, or metacrylic resin, a metal, and so on.

A display device and a light transmissive member may be used as the target of the antireflection treatment, and a member to be subjected to the antireflection treatment may be a front surface plate, a polarizer, a retarder, a light reflecting sheet, a prism sheet, a polarization reflecting sheet, a protective plate made of acrylic or the like, or a hard coat layer disposed on a surface of the polarizer, all of which form an uppermost surface of the display device, in particular a liquid crystal display device. The display device may be a self-light emitting display element or a non-self-light emitting display element. Further, the target of the antireflection treatment may be an optical element such as a lens, a windowpane, a printed object, a photograph, a painted object, a lighting instrument, a casing, and so on.

As shown in FIG. 1, a surface of the moth-eye film 11 has a moth-eye structure on which a plurality of small convex portions are arranged in series. Each convex portion is tapered toward a tip end. A surface of the base 16 has a concave-convex structure that inclines more gently than the small convex portions, and the surface of the moth-eye film 11 also has a gentle concave-convex structure corresponding to that of the base 16. The gentle concave-convex structure is formed by AG treatment. A distance between vertices of the convex portions forming the concave-convex structure is set to be much greater than the wavelength of visible light, for example 5 to 100 µm. With this duplex structure, an antireflection effect and an antiglare effect can be obtained simultaneously. The AG-treated concave-convex structure may also be provided on a part of a flat surface. Note that in the first embodiment, the AG treatment may be omitted.

As shown in FIG. 2, a moth-eye structure in which a width between vertices of adjacent convex portions 12 is no greater than the wavelength of visible light is formed on the surface of the moth-eye film 11. In other words, a plurality of the convex portions 12 is arranged on the surface of the moth-eye film 11 at intervals or a pitch no greater than the wavelength of visible light. The aforesaid width indicates the interval between adjacent convex portions in a case where the convex portions 12 have an aperiodic structure, and indicates the pitch of adjacent convex portions in a case where the convex portions 12 have a periodic structure. Note that when the convex portions are arranged irregularly (in an aperiodic arrangement), unnecessary diffracted light is not generated, and therefore an aperiodic arrangement is more preferable. The moth-eye film 11 is constituted by the convex portions 12 and a backing portion 13 positioned below (on the base side of) the convex portions 12.

A resin that hardens under a certain condition and can be subjected to optical nanoprinting or thermal nanoprinting, for example, may be used as a material for forming the convex portions 12 of the moth-eye film. A photo-curable resin such as acrylate resin or methacrylate resin that can be subjected to optical nanoprinting for forming a fine pattern is particularly preferable.

The backing portion 13 is constituted by a plurality of layers, including a resin residue film layer formed when the convex portions 12 are molded, a film base on which the moth-eye structure is formed and maintained, and an adhesive layer for adhering the moth-eye film 11 to the base 16. The resin residue film layer is a partial residual film not turned into convex portions during formation of the convex portions 12, and is constituted by an identical material to the convex portions 12.

A resin material or the like such as triacetyl cellulose, polyethylene terephthalate, polyolefin resin formed from a cyclic olefin polymer (represented by norbornene-based resins such as a product name "Zeonor" (manufactured by Zeon Corporation) and a product name "Arton" (manufactured by JSR Corporation)), polypropylene, polymethylpentene, polycarbonate resin, polyethylene naphthalate, polyurethane, polyether ketone, polysulphone, polyether sulphone, polyester, polystyrene resin, or acrylic resin, for example, may be used as the film base. An anchor treatment layer for enhancing adherence, a hard coat layer, and so on may be formed on a surface of the film base.

There are no particular limitations on the material of the adhesive layer. A separator film (PET, for example) may be adhered to the base 16 side surface of the adhesive layer to protect the adhesive layer.

Figure 3:
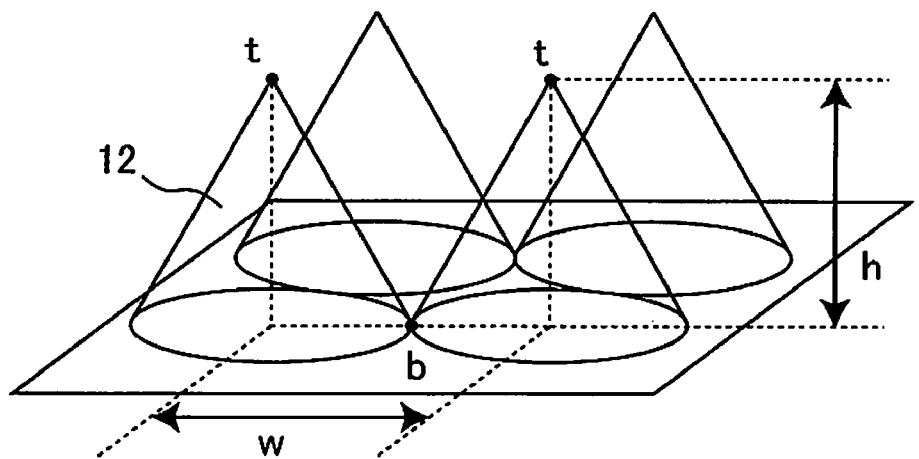
FIG. 3 is a perspective view showing the moth-eye film according to the first embodiment in a case where a unit structure of the convex portion takes a conical shape.
Figure 4:
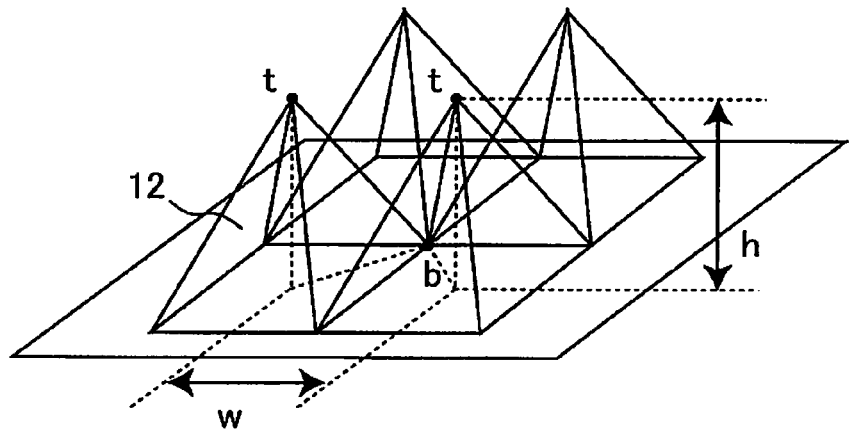
FIG. 4 is a perspective view showing the moth-eye film according to the first embodiment in a case where the unit structure of the convex portion takes a quadrangular pyramid shape.
Figure 5:
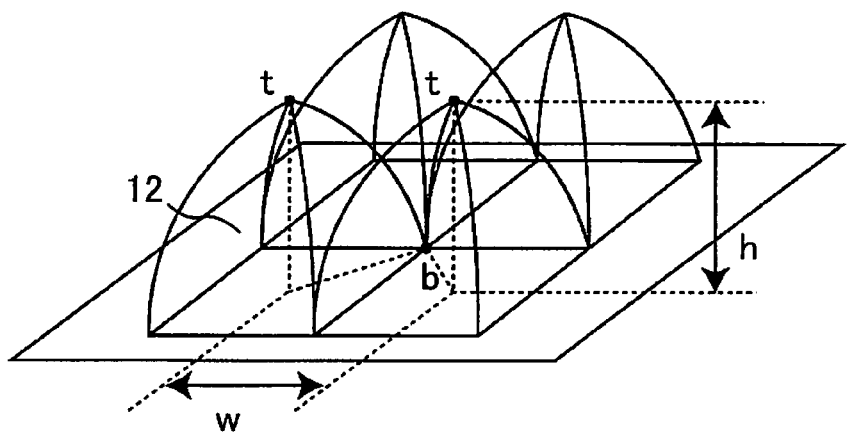
FIG. 5 is a perspective view showing the moth-eye film according to the first embodiment in a case where the unit structure of the convex portion is shaped such that an incline thereof becomes steadily gentler from a bottom point toward a vertex and a tip end thereof is pointed.
Figure 6:
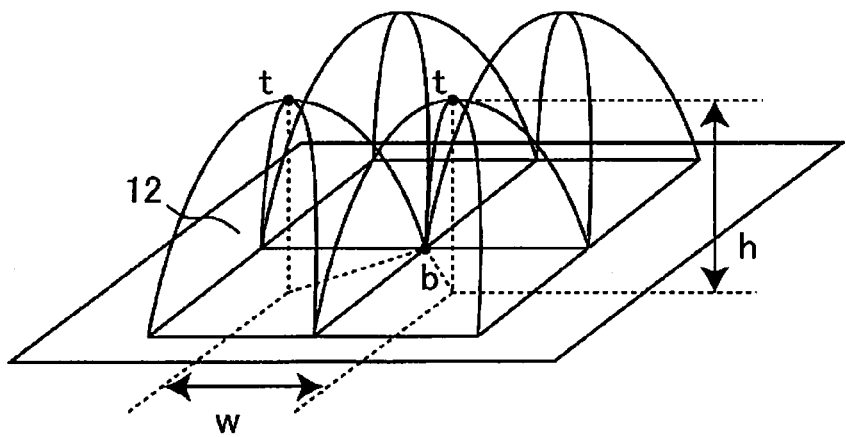
FIG. 6 is a perspective view showing the moth-eye film according to the first embodiment in a case where the unit structure of the convex portion is shaped such that the incline thereof becomes steadily gentler from the bottom point toward the vertex and the tip end thereof is rounded.
Figure 7:
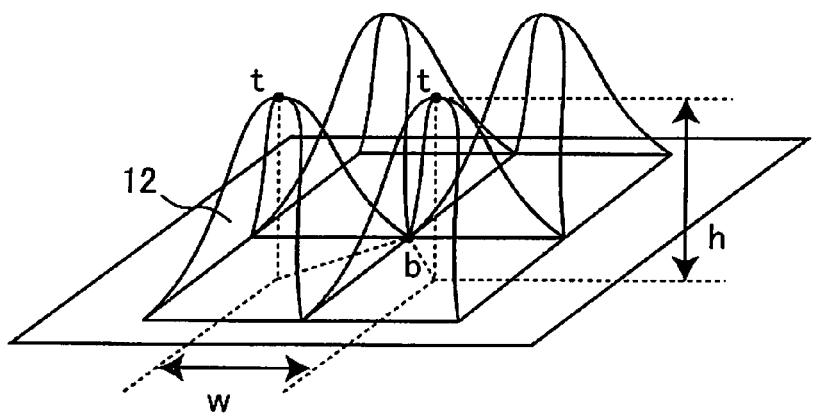
FIG. 7 is a perspective view showing the moth-eye film according to the first embodiment in a case where the unit structure of the convex portion is shaped such that the incline thereof becomes steadily steeper from the bottom point toward the vertex and the tip end thereof is rounded.
Figure 8:
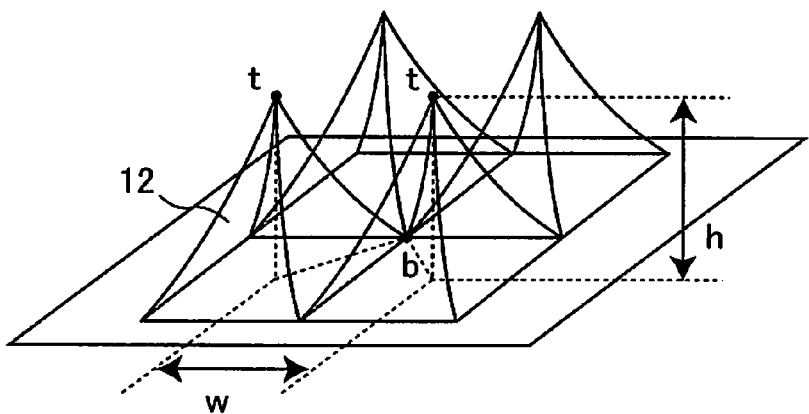
FIG. 8 is a perspective view showing the moth-eye film according to the first embodiment in a case where the unit structure of the convex portion is shaped such that the incline thereof becomes steadily steeper from the bottom point toward the vertex and the tip end thereof is pointed.

FIGS. 3 to 8 are perspective views showing an enlargement of the surface of the moth-eye film according to the first embodiment. FIG. 3 shows a case where a unit structure of the convex portion takes a conical shape. FIG. 4 shows a case where the unit structure of the convex portion takes a quadrangular pyramid shape. FIG. 5 shows a case where the unit structure of the convex portion is shaped such that an incline thereof becomes steadily gentler from a bottom point toward a vertex and a tip end thereof is pointed. FIG. 6 shows a case where the unit structure of the convex portion is shaped such that the incline thereof becomes steadily gentler from the bottom point toward the vertex and the tip end thereof is rounded. FIG. 7 shows a case where the unit structure of the convex portion is shaped such that the incline thereof becomes steadily steeper from the bottom point toward the vertex and the tip end thereof is rounded. FIG. 8 shows a case where the unit structure of the convex portion is shaped such that the incline thereof becomes steadily steeper from the bottom point toward the vertex and the tip end thereof is pointed.

As shown in FIGS. 3 to 8, in the moth-eye structure, a vertex portion of the convex portion 12 is a vertex t, and a point at which the convex portions 12 contact each other is a bottom point b. As shown in FIGS. 3 to 8, a width w between the vertices of adjacent convex portions 12 of the moth-eye structure is expressed by a distance between two points obtained when perpendiculars are dropped from the respective vertices t of the convex portions 12 onto an identical plane. Further, a height h from the vertex to the bottom point of the moth-eye structure is expressed by a distance obtained when a perpendicular is dropped from the vertex t of the convex portion 12 to a plane on which the bottom point b is positioned.

In the moth-eye film according to the first embodiment, the width w between the vertices of adjacent convex portions 12 of the moth-eye structure is no more than 380 nm, preferably no more than 300 nm, and more preferably no more than 200 nm. Note that in FIGS. 3 to 8, a cone, a quadrangular pyramid, a diving bell shape, a dome shape, a church bell shape, and a needle shape are shown as examples of the unit structure of the convex portion 12, but as long as the moth-eye structure of the first embodiment is a concave-convex structure formed with vertices and bottom points and a pitch no greater than the wavelength of visible light, there are no particular limitations on the unit structure, and a shape having staircase-like steps cut into an inclined surface of a cone or the like, for example, may be employed instead.

Figure 9:
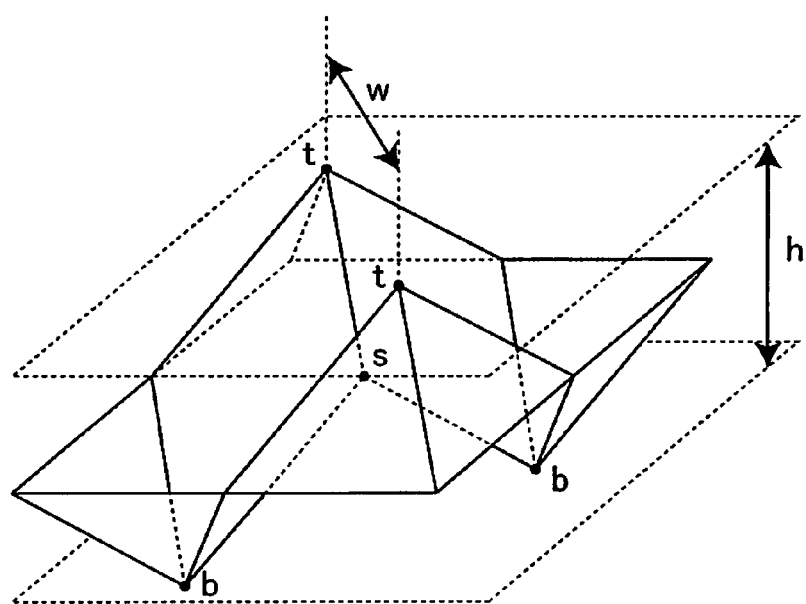
FIG. 9 is a perspective view showing the moth-eye film according to the first embodiment in a case where peripheral heights of the convex portions are uneven.
Figure 10:
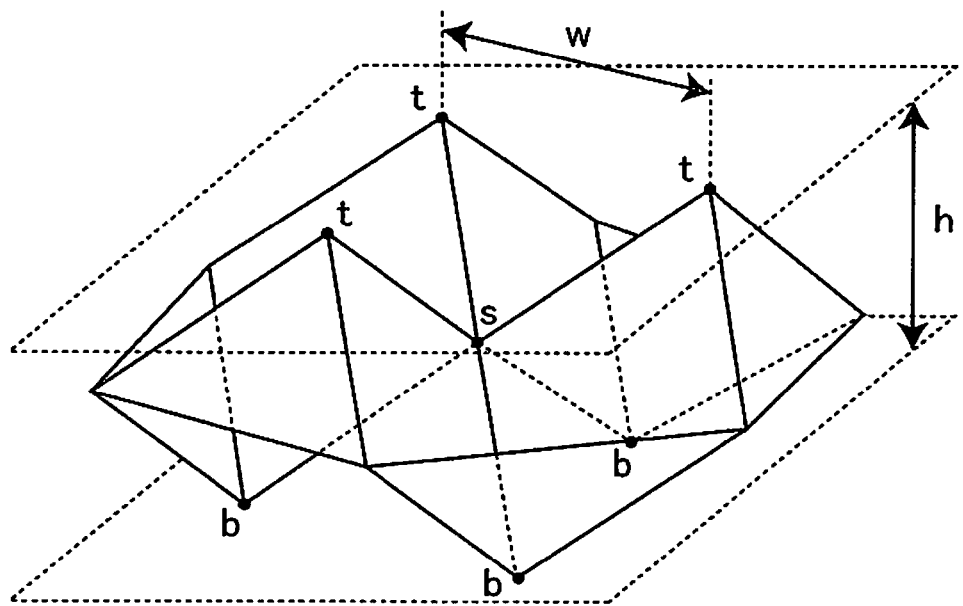
FIG. 10 is a perspective view showing the moth-eye film according to the first embodiment in a case where the peripheral heights of the convex portions are uneven.
Figure 11:
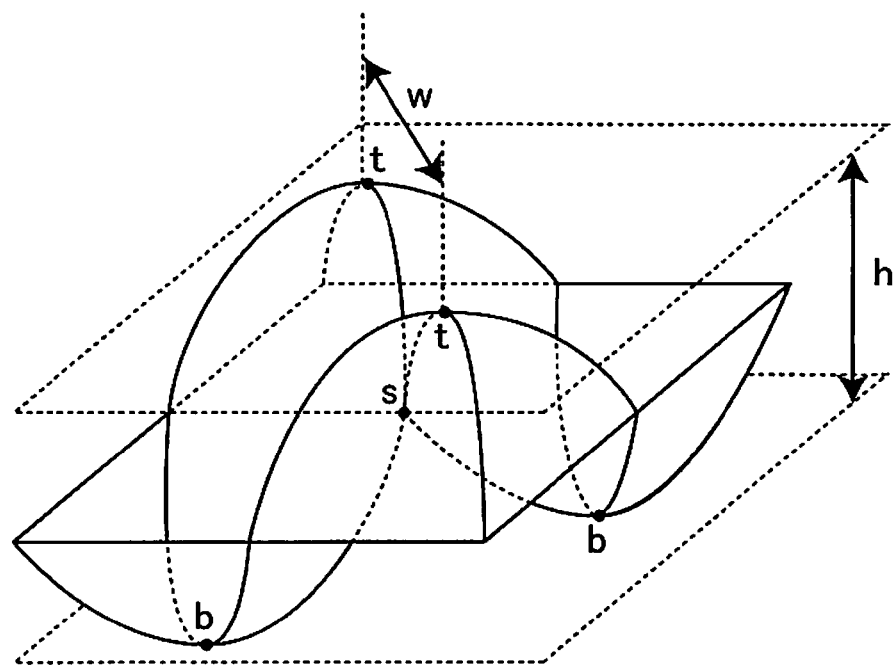
FIG. 11 is a perspective view showing the moth-eye film according to the first embodiment in a case where the peripheral heights of the convex portions are uneven.

The convex portions of the moth-eye film according to the first embodiment may have a plurality of arrays or non-arrays. In other words, convex portions having adjacent bottom points where the convex portions contact each other need not be formed at the same height, and as shown in FIGS. 9 to 11, for example, peripheral heights of the convex portions may be uneven such that points (contact points) on a surface where the respective convex portions contact each other exist with different heights. In this case, it may be said that col portions exist. A col portion is a location where a ridge line of a mountain dips. Here, using a convex portion having a single vertex t as a reference, a plurality of contact points exist in lower positions than the vertex t, thereby forming col portions. In this specification, a contact point in a lowest position on the periphery of an arbitrary convex portion will be referred to as a bottom point b, and a point that is positioned lower than the vertex t but higher than the bottom point b so as to be an equilibrium point of a col portion will be referred to as a col point s. In this case, the distance w between the vertices of the convex portions corresponds to the width between adjacent vertices, while an orthogonal direction distance h from the vertex to the bottom point corresponds to the height of the convex portion.

Figure 12:
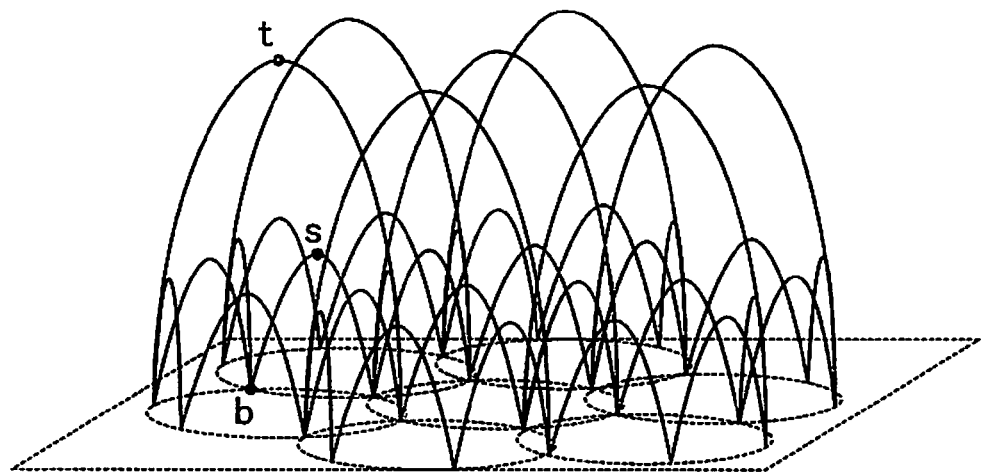
FIG. 12 is a perspective schematic view showing the convex portions of the moth-eye film in detail, and an enlarged view of a case in which the convex portion inclines steadily more gently from the bottom point toward the vertex and includes a col portion and a col point.
Figure 13:
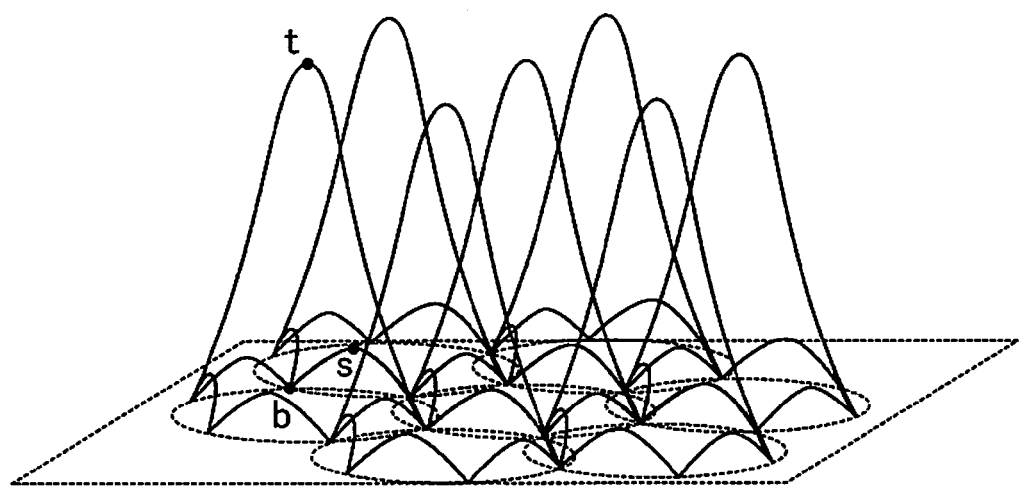
FIG. 13 is a perspective schematic view showing the convex portions of the moth-eye film in detail, and an enlarged view of a case in which the convex portion inclines steadily more steeply from the bottom point toward the vertex and includes a col portion and a col point.

This will now be described in further detail. Using a convex portion having a single vertex as a reference, a case in which the convex portion has a plurality of contact points with adjacent convex portions such that col portions (col points) are formed in lower positions than the vertex t will be described as an example. FIGS. 12 and 13 are perspective schematic views showing the convex portions of the moth-eye film in detail. FIG. 12 is an enlarged view of a case in which the convex portion inclines steadily more gently from the bottom point toward the vertex and includes a col portion and a col point, and FIG. 13 is an enlarged view of a case in which the convex portion inclines steadily more steeply from the bottom point toward the vertex and includes a col portion and a col point. As shown in FIGS. 12 and 13, a plurality of contact points with adjacent convex portions exist relative to the single vertex t of the convex portion in lower positions than the vertex t. As can be seen by comparing FIGS. 12 and 13, the col point s is more likely to be formed at a lower height when the incline becomes steadily steeper from the bottom point to the vertex than when the incline becomes steadily gentler from the bottom point to the vertex.

Figure 14:
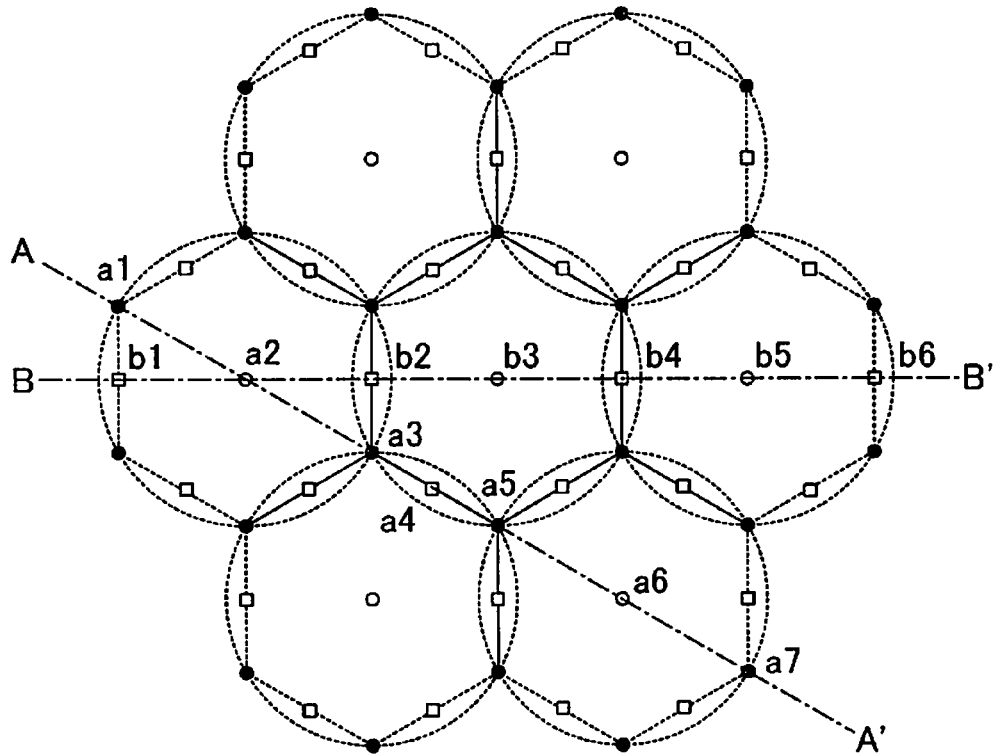
FIG. 14 is a planar schematic view showing the convex portions of the moth-eye film according to the first embodiment.

FIG. 14 is a planar schematic view showing the convex portions of the moth-eye film according to the first embodiment. In FIG. 14, points indicated by white circles represent the vertices, points indicated by black circles represent the bottom points, and white squares represent the col points of the col portions. As shown in FIG. 14, bottom points and col points are formed on a concentric circle centering on a single vertex. FIG. 14 shows a pattern in which six bottom points and six col points are formed on a single circle, but the present invention is not limited thereto in reality and includes more irregular arrangements. White circles represent the vertices, white squares represent the col points, and black circles represent the bottom points.

Figure 15:
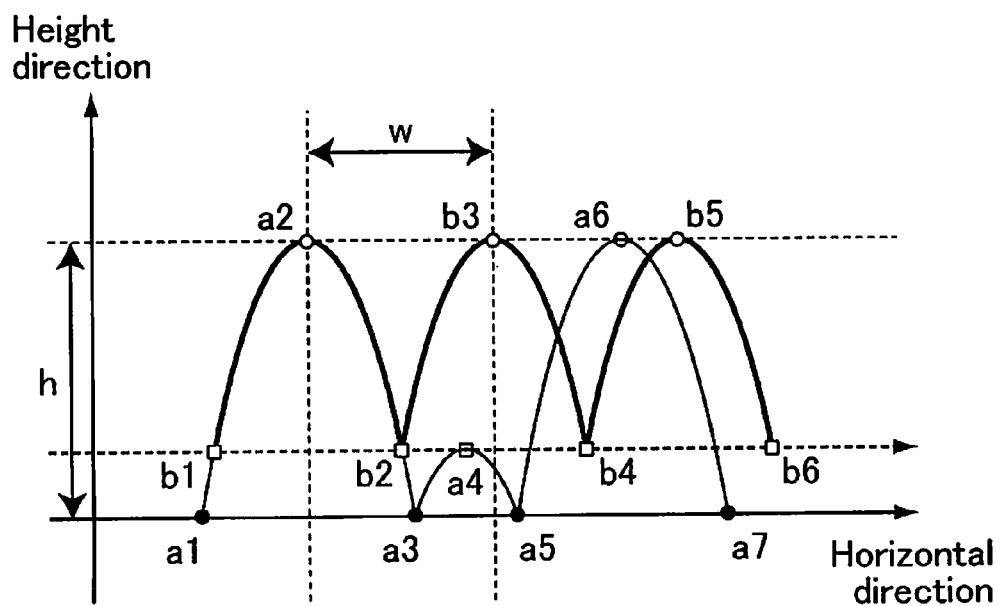
FIG. 15 is a schematic view showing a cross-section taken along an A-A' line in FIG. 14 and a cross-section taken along a B-B' line in FIG. 14.

FIG. 15 is a schematic view showing a cross-section taken along an A-A' line in FIG. 14 and a cross-section taken along a B-B' line in FIG. 14. Here, vertices are represented by a2, b3, a6, b5, col portions are represented by b1, b2, a4, b4, b6, and bottom points are represented by a1, a3, a5, a7. At this time, a relationship between a2 and b3 and a relationship between b3 and b5 correspond to relationships between adjacent vertices, while a distance between a2 and b3 and a distance between b3 and b5 corresponds to the width w between adjacent vertices. Further, a distance between a2 and either a1 or a3 and a distance between a6 and either a5 or a7 correspond to the height h of the convex portion.

In FIGS. 3 to 13, an entire arrangement of the plurality of convex portions is set such that repeated units are disposed in a period no greater than the wavelength of visible light. However, the arrangement may be partially aperiodic or completely aperiodic. Further, widths between a single arbitrary convex portion from the plurality of convex portions and the plurality of adjacent convex portions thereto may differ from each other. An aperiodic arrangement is advantageous in that diffraction and scattering during reflection and transmission due to a regular arrangement are less likely to occur, and pattern manufacture is easier. Further, as shown in FIGS. 9 to 15, the moth-eye film may be formed with a plurality of contact points having different heights on the periphery of a single convex portion to be lower than the vertex thereof. Note that the surface of the moth-eye film may also include irregularities of a greater order than the nano order, for example micro-order or larger irregularities. In other words, the surface of the moth-eye film may have a duplex concave-convex structure.

Figure 16:
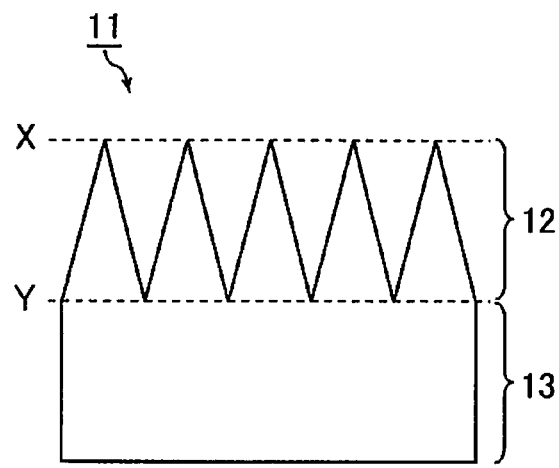
FIG. 16 is a schematic view showing a principle for realizing low reflection with the moth-eye film according to the first embodiment and a cross-sectional structure of the moth-eye film.
Figure 17:
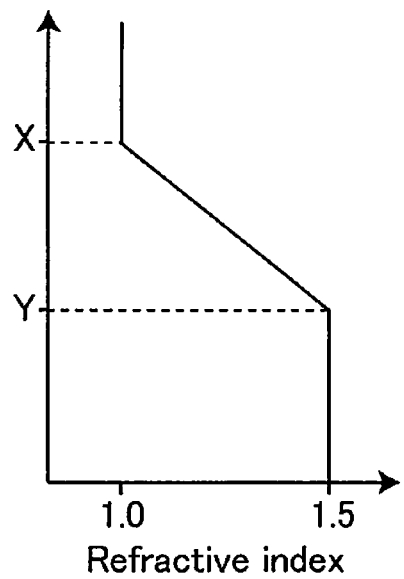
FIG. 17 is a schematic view showing a principle for realizing low reflection with the moth-eye film according to the first embodiment and a refractive index (effective refractive index) sensed by light incident on the moth-eye film.

Principles by which the moth-eye film according to the first embodiment realizes low reflection will now be described. FIGS. 16 and 17 are schematic views showing principles for realizing low reflection with the moth-eye film according to the first embodiment. FIG. 16 shows a cross-sectional structure of the moth-eye film, and FIG. 17 shows a refractive index (effective refractive index) of light that enters the moth-eye film. As shown in FIGS. 16 and 17, the moth-eye film 11 according to the first embodiment is constituted by the convex portions 12 and the backing portion 13. When light travels from one medium to a different medium, the light is diffracted, transmitted, and reflected on a medium interface between the two media. The degree of diffraction and so on is determined by the refractive index of the medium to which the light travels. For example, air has a refractive index of approximately 1.0 and resin has a refractive index of approximately 1.5. In the first embodiment, the unit structure of the concave-convex structure formed on the surface of the moth-eye film has a drill shape. In other words, the unit structure is shaped such that a width thereof gradually decreases in a tip end direction. It may therefore be considered, as shown in FIGS. 16 and 17, that in a convex portion 12 (between X-Y) positioned at an interface between an air layer and the moth-eye film, the refractive index increases gradually and continuously from approximately 1.0, which is the refractive index of air, to the refractive index of a film constitutional material (in the case of resin, approximately 1.5). An amount of reflected light is dependent on a refractive index difference between media, and therefore, by ensuring artificially that a light diffraction interface does not substantially exist, almost all light passes through the moth-eye film, leading to a great reduction in reflectance on the film surface.

Figure 18:
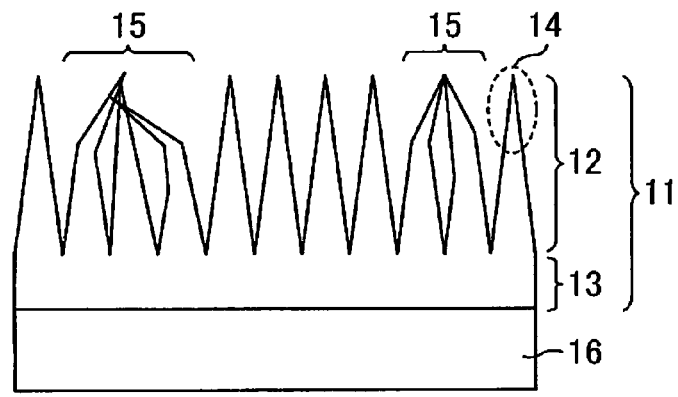
FIG. 18 is a sectional schematic view showing a sticking structure formed when convex portions of the moth-eye film gather together.
Figure 19:
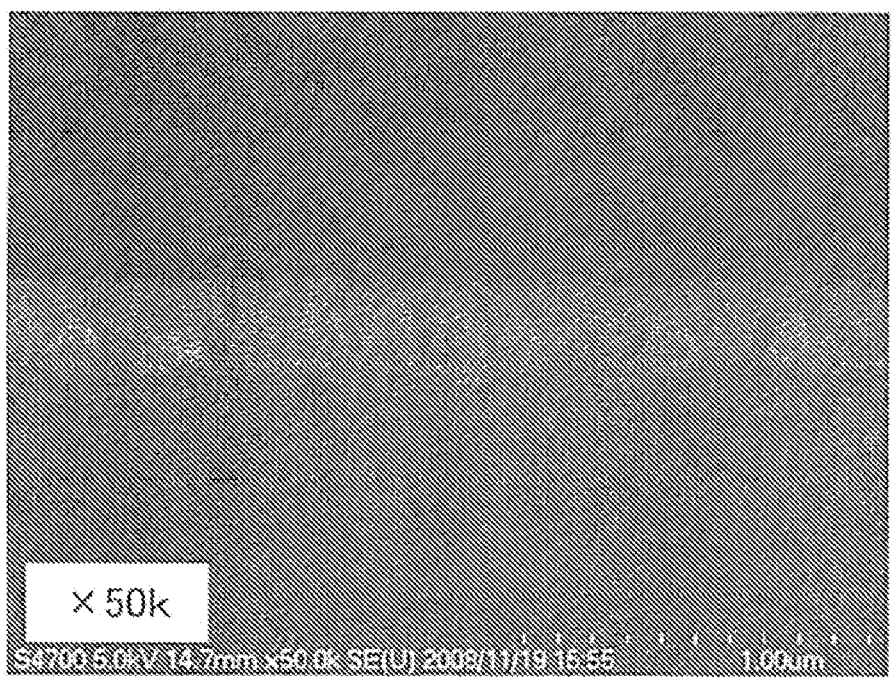
FIG. 19 is a sectional photograph of a moth-eye film manufactured in Example 1.
Figure 20:
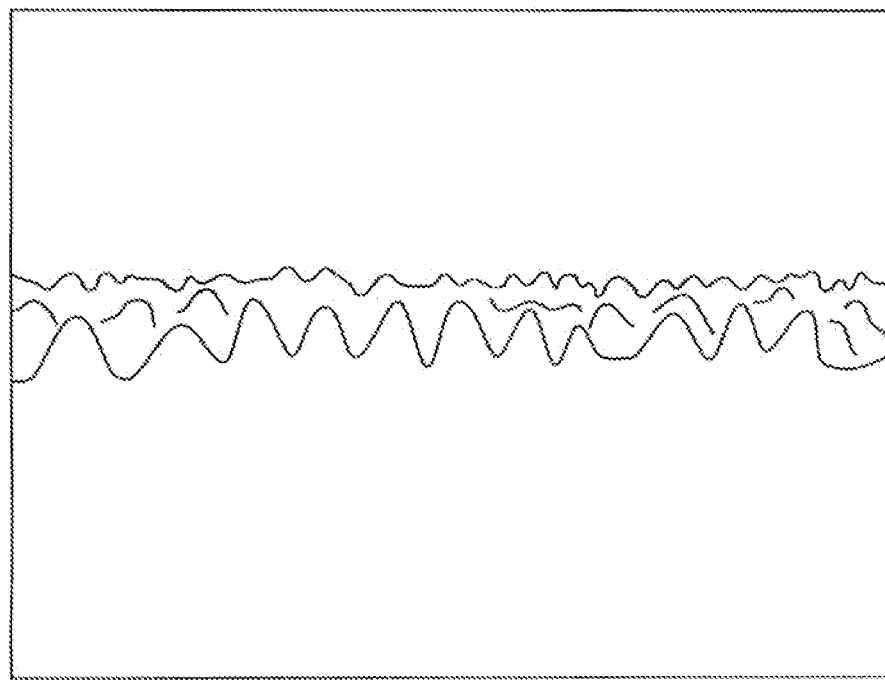
FIG. 20 is a sectional schematic view of the moth-eye film manufactured in Example 1.
Figure 21:
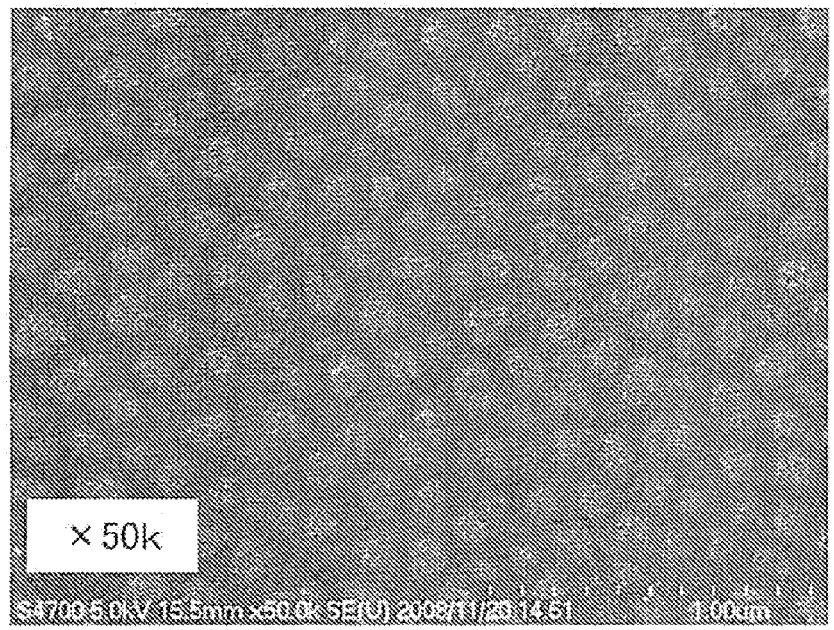
FIG. 21 is a planar photograph of the moth-eye film manufactured in Example 1.
Figure 22:
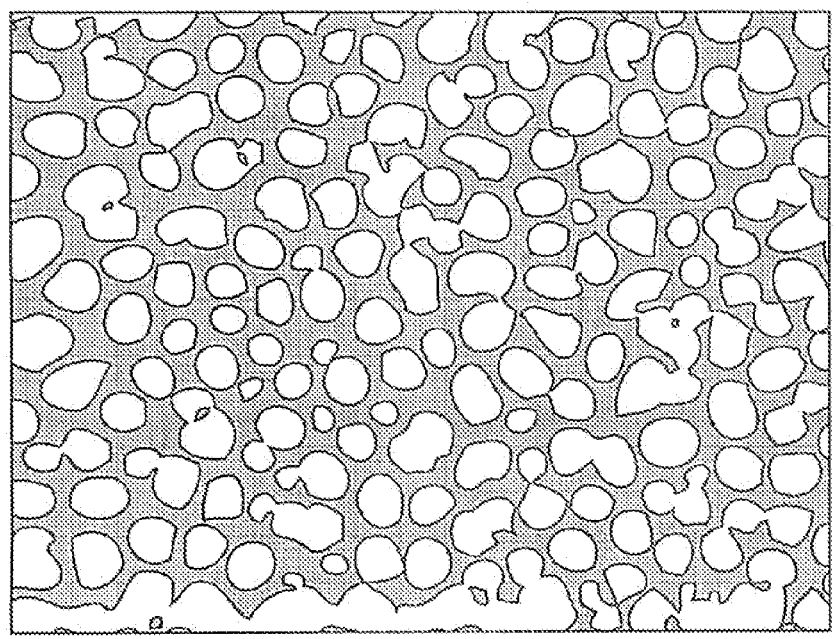
FIG. 22 is a planar schematic view of the moth-eye film manufactured in Example 1.
Figure 23:
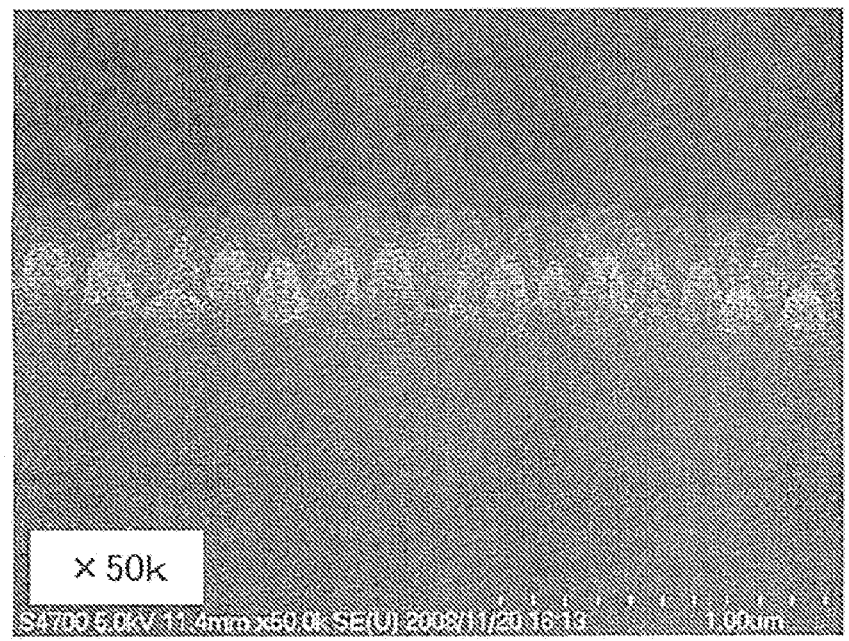
FIG. 23 is a sectional photograph of a moth-eye film manufactured in Example 2.
Figure 24:
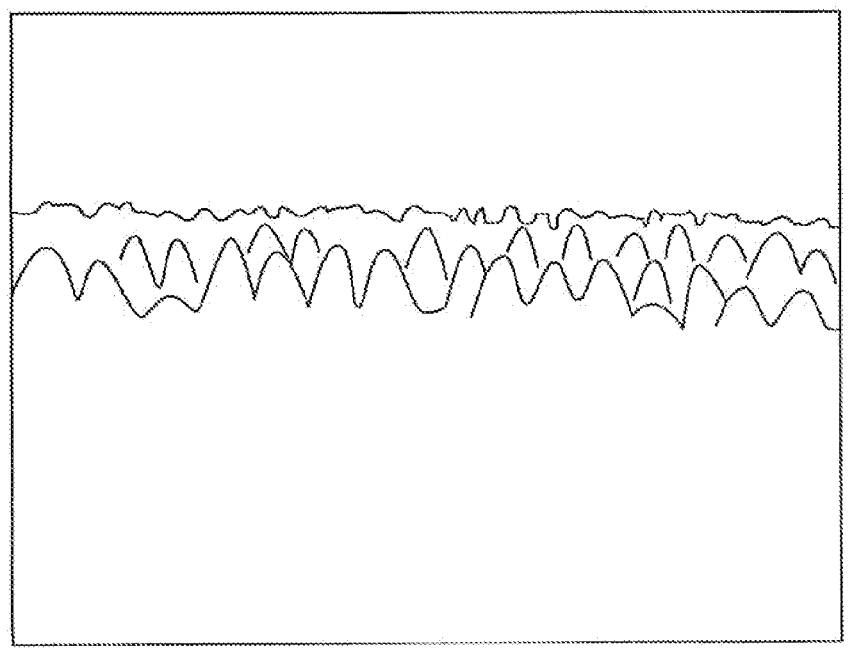
FIG. 24 is a sectional schematic view of the moth-eye film manufactured in Example 2.
Figure 25:
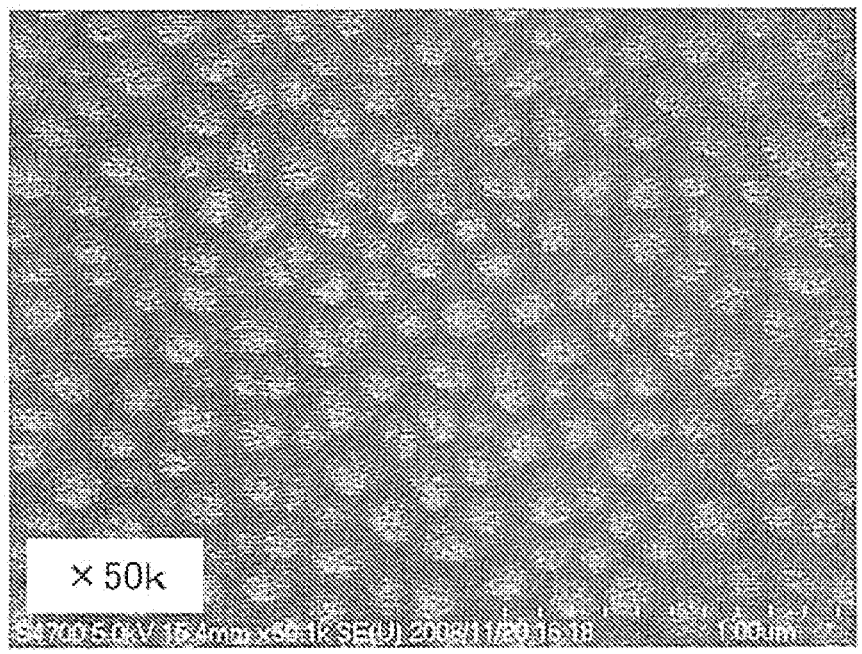
FIG. 25 is a planar photograph of the moth-eye film manufactured in Example 2.
Figure 26:
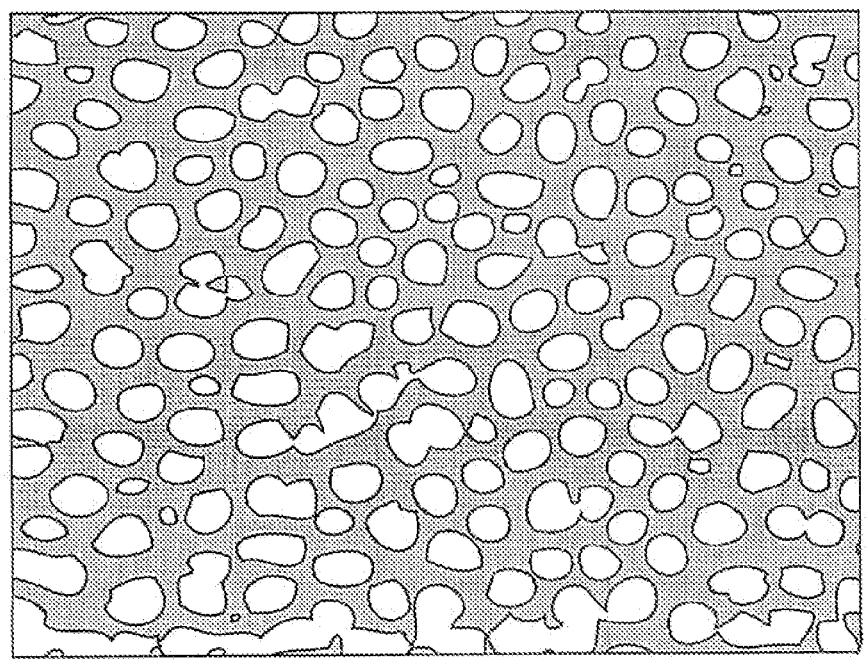
FIG. 26 is a planar schematic view of the moth-eye film manufactured in Example 2.
Figure 27:
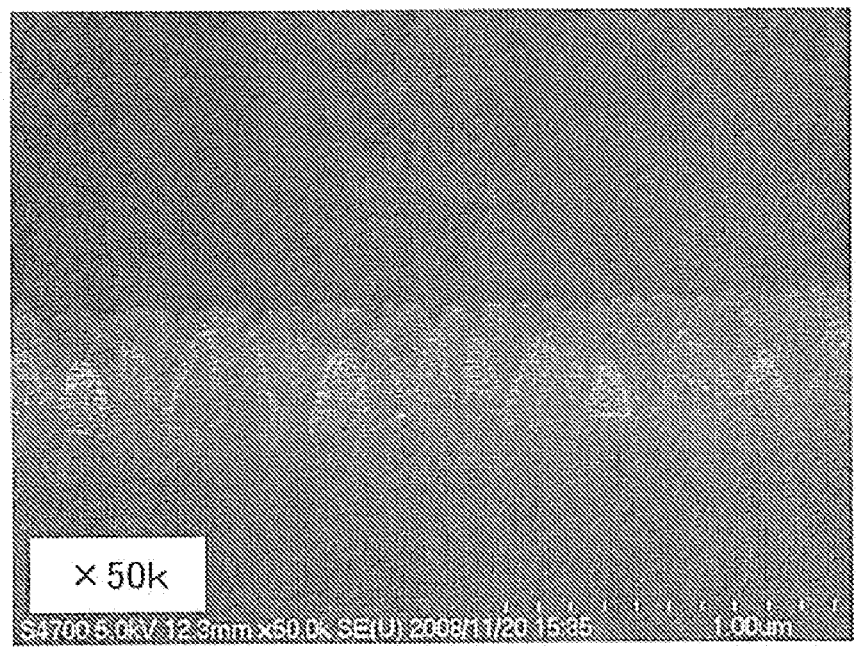
FIG. 27 is a sectional photograph of a moth-eye film manufactured in Reference Example 1.
Figure 28:
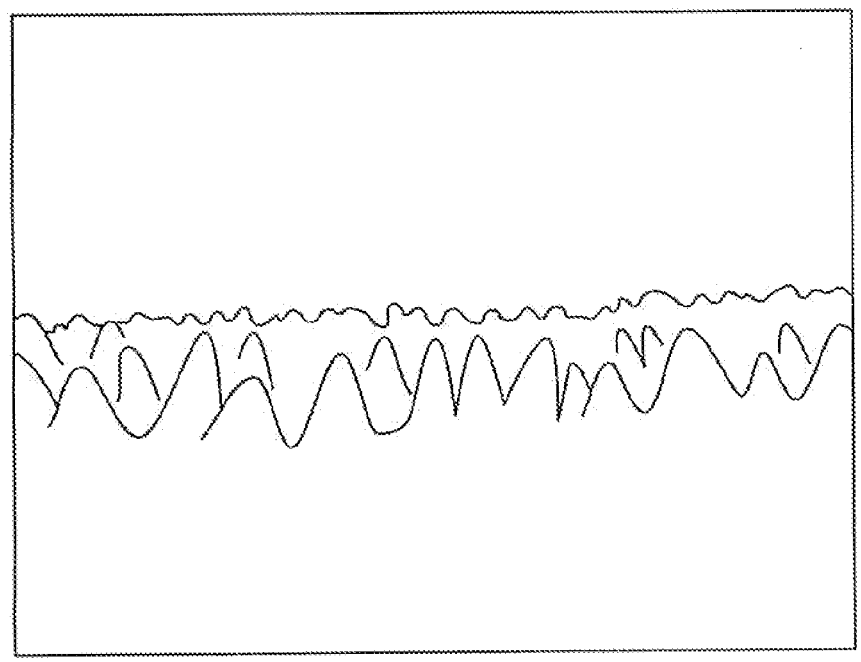
FIG. 28 is a sectional schematic view of the moth-eye film manufactured in Reference Example 1.
Figure 29:
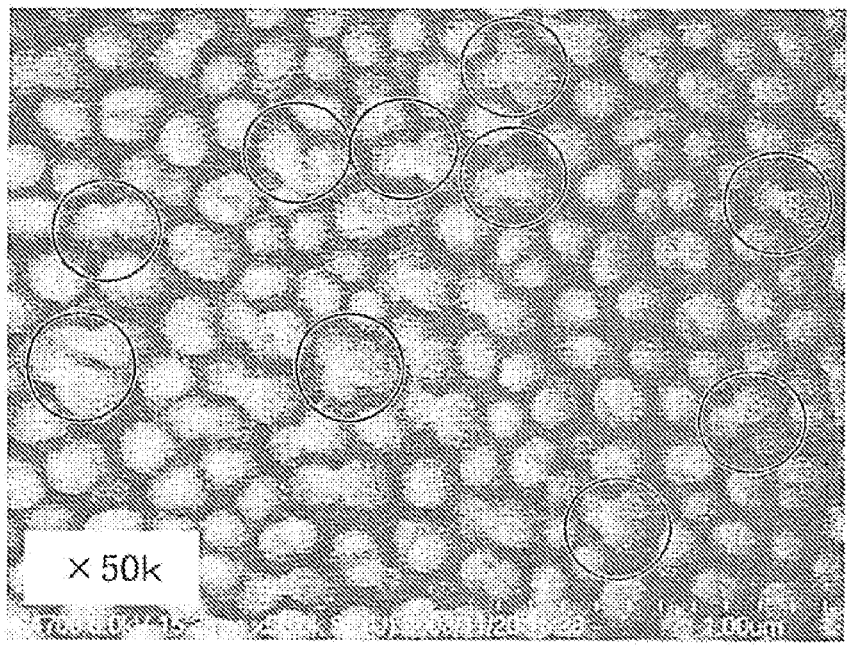
FIG. 29 is a planar photograph of the moth-eye film manufactured in Reference Example 1.
Figure 30:
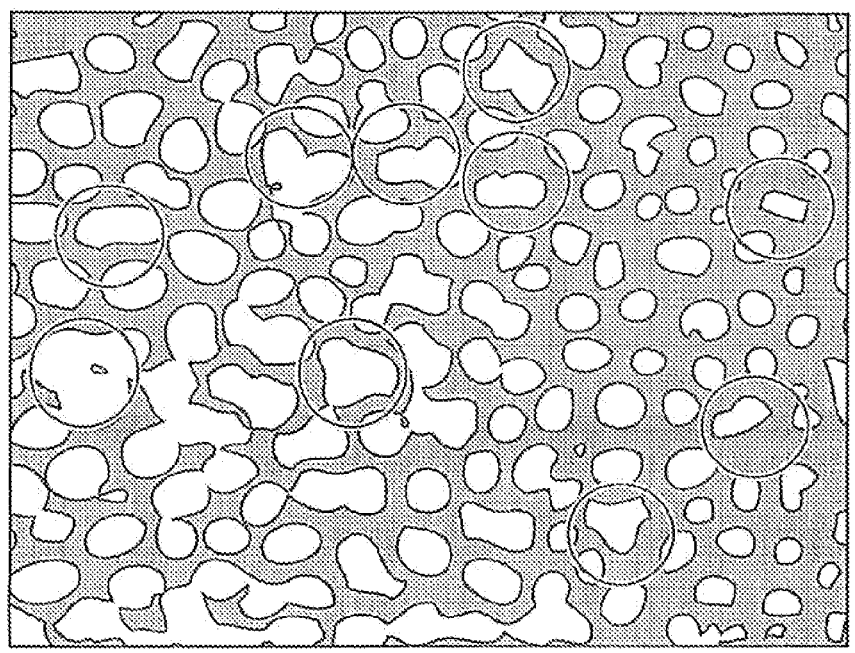
FIG. 30 is a planar schematic view of the moth-eye film manufactured in Reference Example 1.
Figure 31:
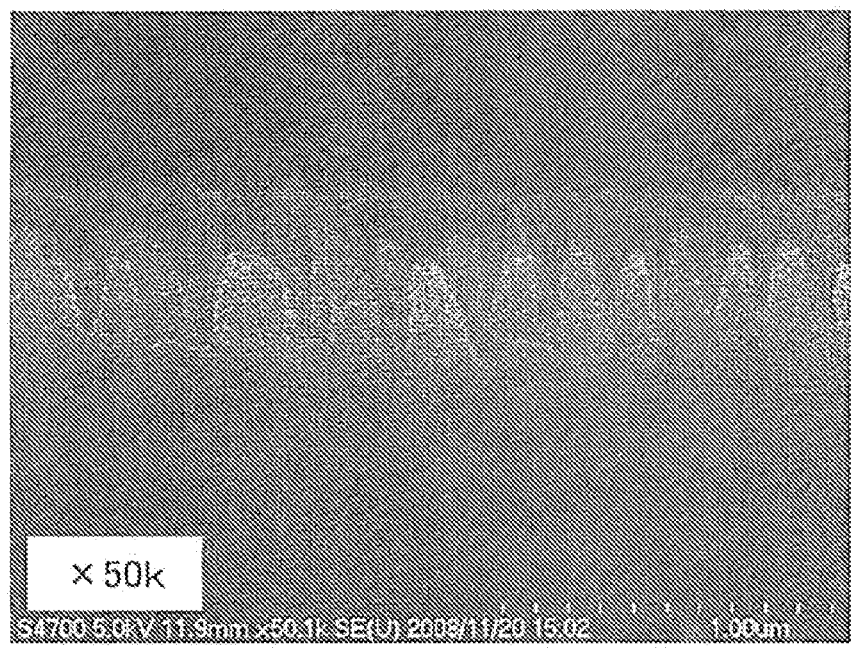
FIG. 31 is a sectional photograph of a moth-eye film manufactured in Reference Example 2.
Figure 32:
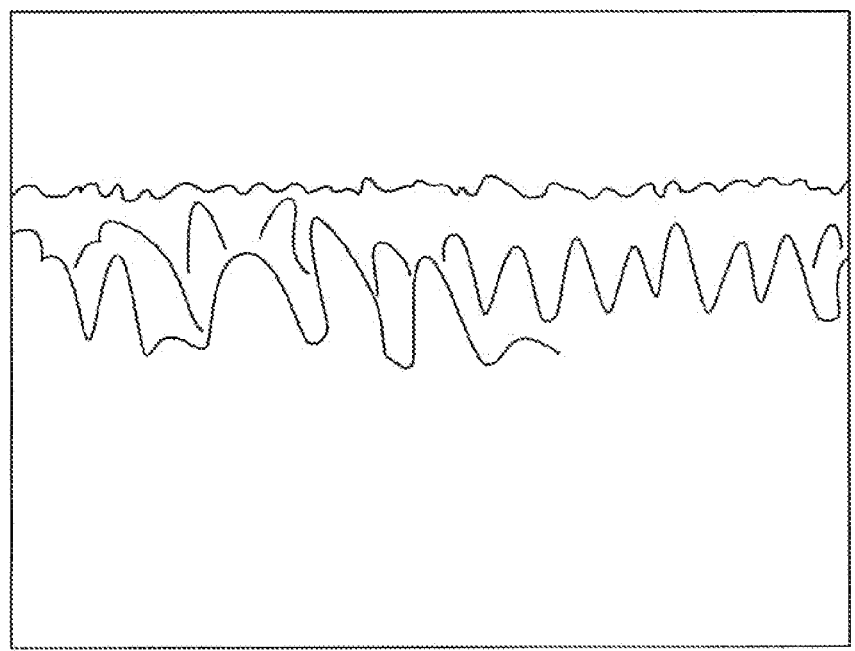
FIG. 32 is a sectional schematic view of the moth-eye film manufactured in Reference Example 2.
Figure 33:
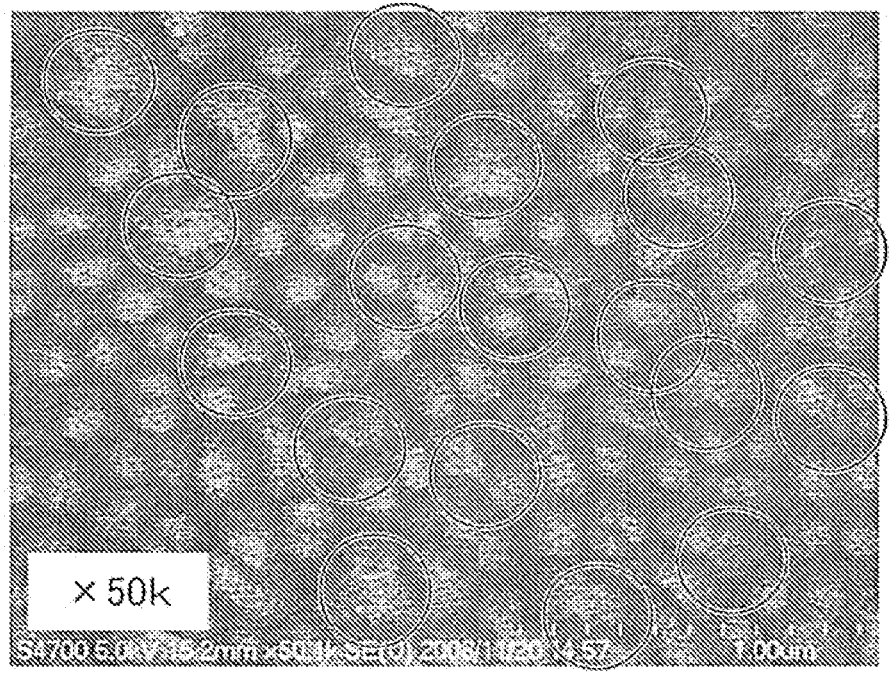
FIG. 33 is a planar photograph of the moth-eye film manufactured in Reference Example 2.
Figure 34:
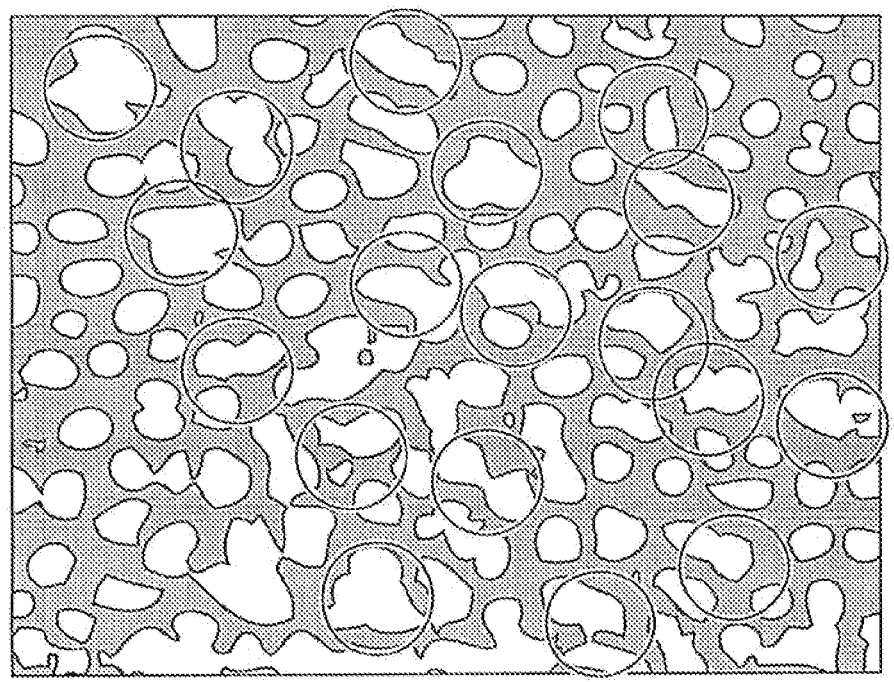
FIG. 34 is a planar schematic view of the moth-eye film manufactured in Reference Example 2.

FIG. 18 is a sectional schematic view showing a sticking structure formed when convex portions of the moth-eye film gather together. A part shown in FIG. 18 formed when tip end portions 14 of a plurality of the convex portions 12 bend such that the convex portions 12 are joined to each other constitutes a sticking structure (a bundle structure) 15. FIG. 18 shows an example in which two or three tip end portions 14 are joined to each other, but there are no particular limitations on the number of convex portions 12 constituting the sticking structure 15.

The sticking structure 15 scatters light emitted toward the surface constituted by the convex portions 12 of the moth-eye film 11 and light that enters from a surface side on which the convex portions of the moth-eye film 11 are not formed and exits from the surface side on which the convex portions of the moth-eye film 11 are formed. Therefore, if the number of sticking structures increases, cloudiness is more likely to occur on a display due to scattered light when the moth-eye film is adhered to a surface of a display device, for example.

In the moth-eye film 11 according to the first embodiment, the sticking structure 15 is either not formed at all or formed so as to have a negligible effect. In the first embodiment, a diameter of each sticking structure is assumed to be no less than 0.3 µm. A sticking structure smaller than 0.3 µm hardly exhibits light scattering effects. When the sticking structure 15 is not formed at all, or in other words when a density of the number of sticking structures relative to a planar area of the antireflection film is $0/\mu m^2$, the sticking structure 15 has no effect, and therefore light scattering does not occur.

The density of the number of sticking structures relative to the planar area of the antireflection film may be less than $2.1/\mu m^2$. By suppressing the density of the number of sticking structures to this range, cloudiness caused by light scattering is unlikely to be perceived when the moth-eye film according to the first embodiment is adhered to the surface of a display device, and therefore a clear display can be obtained.

A method of manufacturing the moth-eye film according to the first embodiment will be described below using Examples 1 to 3 and Reference Examples 1 and 2 in which the moth-eye film was actually manufactured.

First, a 10 cm square glass substrate was prepared, whereupon aluminum (Al) serving as a mold material was deposited on the glass substrate at a film thickness of 1.0 µm using a sputtering method. Next, an anodic oxidation process and an immediately following etching process were performed repeatedly on the aluminum to form an anodized layer having a large number of small holes (concave portions), wherein a distance between bottom points of adjacent holes corresponded to a length no greater than the wavelength of visible light. More specifically, a mold was manufactured by performing anodic oxidation, etching, anodic oxidation, etching, anodic oxidation, etching, anodic oxidation, etching, and anodic oxidation in that order (five anodic oxidation processes and four etching processes). By performing the anodic oxidation process and the etching process repeatedly in this manner, the formed small holes take a tapered shape that narrows toward the interior of the mold. Note that the substrate of the mold is not limited to glass, and a metallic material such as SUS or Ni, or a resin material such as polypropylene, polymethylpentene, polyolefin resin formed from a cyclic olefin polymer (represented by norbornene-based resins such as a product name "Zeonor" (manufactured by Zeon Corporation) and a product name "Arton" (manufactured by JSR Corporation)), polycarbonate resin, polyethylene terephthalate, polyethylene naphthalate, or triacetyl cellulose may be used instead. Further, an aluminum bulk substrate may be used instead of an aluminum-deposited substrate. Note that the mold may take a flat plate shape or a rolled (cylindrical) shape.

The anodic oxidation was performed under the following conditions: oxalic acid 0.6 wt %; liquid temperature 5° C.; and applied voltage 80 V. An anodic oxidation time was varied among the respective examples. By adjusting the anodic oxidation time, holes of different sizes were formed. A relationship between the anodic oxidation time and the size of the hole is illustrated specifically in Table 1 below. In all examples, the etching was performed under the following conditions: phosphoric acid 1 mol/l; liquid temperature 30° C.; 25 minutes.

A 2P (photo polymer) resin solution having a light transmitting property was dripped onto the surface of the respective molds having different concave-convex heights manufactured in the manufacturing process described above, whereupon a TAC film was adhered to a 2P resin layer formed from the 2P resin solution while making sure that no bubbles intrude. Next, ultraviolet (UV) light was emitted onto the 2P resin layer at 2 $J/cm^2$ to harden the 2P resin layer, whereupon a stacked film constituted by a resulting hardened 2P resin film and the TAC film was peeled away. Instead of the 2P method (photo-polymerization method) described above, various other methods such as a hot pressing method (an embossing method), an injection molding method, a duplication method such as a sol-gel method, a fine concave-convex shaped sheet laminating method, and a fine concave-convex layer transfer method may be selected appropriately as a specific method of forming (duplicating) a fine concave-convex shape on a base using a mold, depending on the application of the antireflection product, the material of the base, and so on.

Finally, the stacked film constituted by the 2P resin film serving as the moth-eye film and the TAC film was adhered to respective transparent acrylic plates, whereby samples of the respective examples were completed.

A depth of the concave-convex shape of the completed samples and molds was measured using an SEM (Scanning Electron Microscope). The sticking structures were also observed using an SEM.

Table 1 shows respective numerical values of the anodic oxidation time, the depth of concave portions of the mold, the height of the convex portions of the moth-eye film (a transferred object) onto which the concave-convex shape of the mold was transferred, a transfer ratio, and an aspect ratio of the moth-eye film (the transferred object) with respect to Examples 1 to 3 and Reference Examples 1 and 2.

TABLE 1

| | Anodic Oxidation Time (sec.) | Depth of Concave Portion (nm) | Height of Transferred Object (nm) | Transfer Ratio | Aspect Ratio |
|---|---|---|---|---|---|
| Example 1 (Mold 1) | 15 | 231 | 143 | 0.62 | 0.72 |
| Example 2 (Mold 2) | 20 | 328 | 175 | 0.53 | 0.88 |
| Example 3 (Mold 3) | 24 | 387 | 219 | 0.57 | 1.10 |
| Reference Example 1 (Mold 4) | 33 | 520 | 255 | 0.49 | 1.28 |
| Reference Example 2 (Mold 5) | 38 | 600 | 373 | 0.62 | 1.87 |

FIGS. 19 to 34 are planar photographs, sectional photographs, and schematic views of the moth-eye films manufactured in Examples 1 and 2 and Reference Examples 1 and 2. FIGS. 19 to 22 show Example 1, FIGS. 23 to 26 show Example 2, FIGS. 27 to 30 show Reference Example 1, and FIGS. 31 to 34 show Reference Example 2. FIGS. 19, 23, 27 and 31 show sectional photographs, FIGS. 20, 24, 28 and 32 show sectional schematic views, FIGS. 21, 25, 29 and 33 show planar photographs, and FIGS. 22, 26, 30 and 34 show planar schematic views.

As is evident from FIGS. 21, 22, 25 and 26, no sticking structures at all were formed on the moth-eye films of Examples 1 and 2. As is evident from FIGS. 29, 30, 33 and 34, on the other hand, a plurality of sticking structures were formed on the moth-eye films of Reference Examples 1 and 2. With regard to the moth-eye films of Examples 2 and 3, sticking structures were confirmed when the moth-eye films were observed in a wider range. The density of the number of sticking structures in the moth-eye film of Example 2 was $0.5/\mu m^2$, while the density of the number of sticking structures in the moth-eye film of Example 3 was $1.5/\mu m^2$.

Parts surrounded by circles in FIGS. 29, 30, 33 and 34 indicate sticking structures having a diameter of at least 0.3 μm, formed when the tip end portions of the convex portions are joined to each other. On the planar photographs shown in FIGS. 29 and 33, a length of a longitudinal side is 1.9 μm and a length of a latitudinal side is 2.5 μm, whereby a surface area is 4.8 $\mu m^2$. Hence, ten sticking structures each having a surface area of 4.8 $\mu m^2$ are formed on the moth-eye film of Reference Example 1, while nineteen sticking structures each having a surface area of 4.8 $\mu m^2$ are formed on the moth-eye film of Reference Example 2. In other words, the density of the number of sticking structures in the moth-eye film of Reference Example 1 is $2.1/\mu m^2$, while the density of the number of sticking structures in the moth-eye film of Reference Example 2 is $4.0/\mu m^2$.

Figure 35:
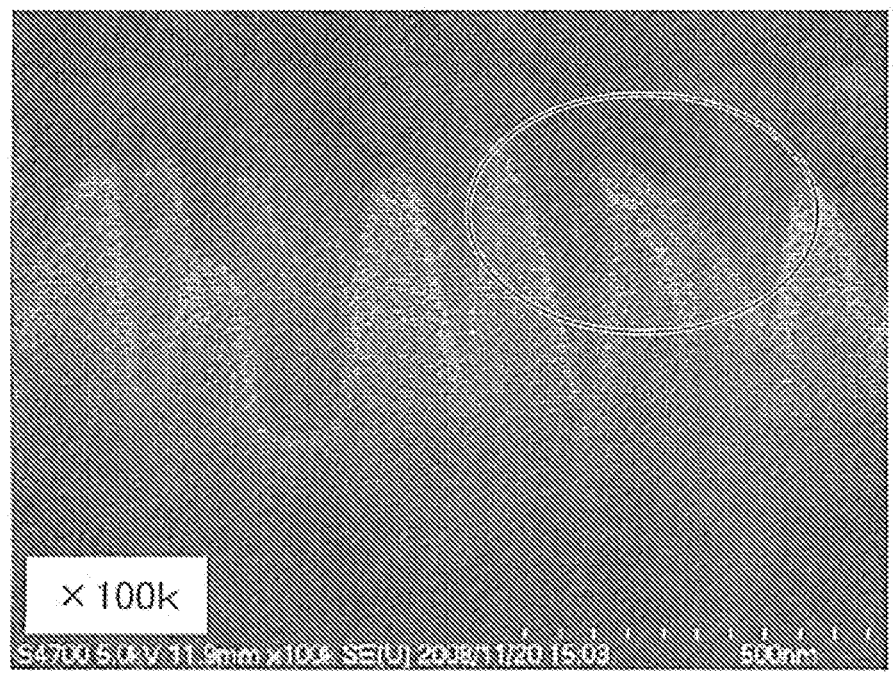
FIG. 35 is a sectional photograph showing an enlargement of the moth-eye film of Reference Example 2.
Figure 36:
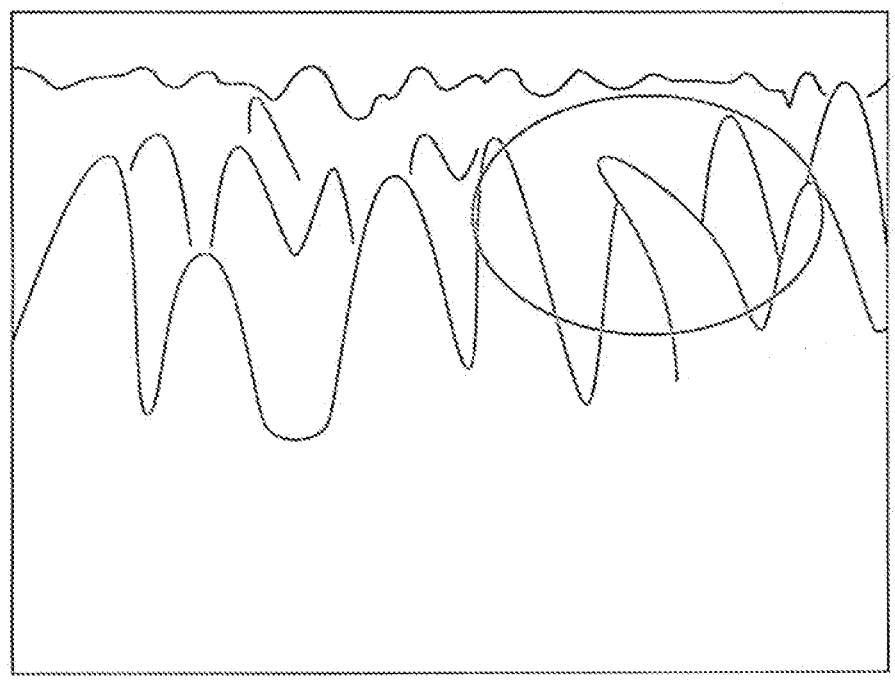
FIG. 36 is a sectional schematic view showing an enlargement of the moth-eye film of Reference Example 2.
Figure 37:
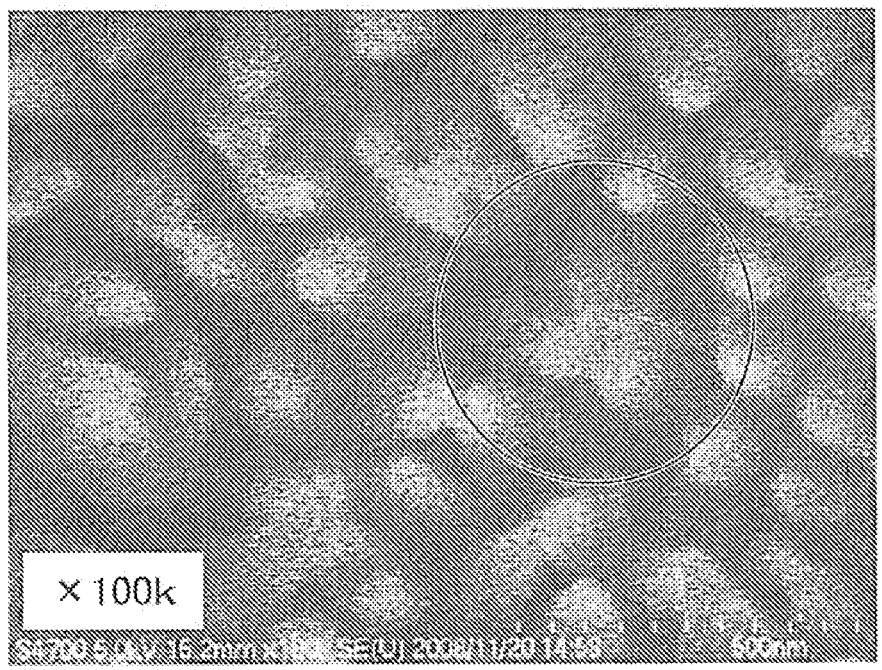
FIG. 37 is a planar photograph showing an enlargement of the moth-eye film of Reference Example 2.
Figure 38:
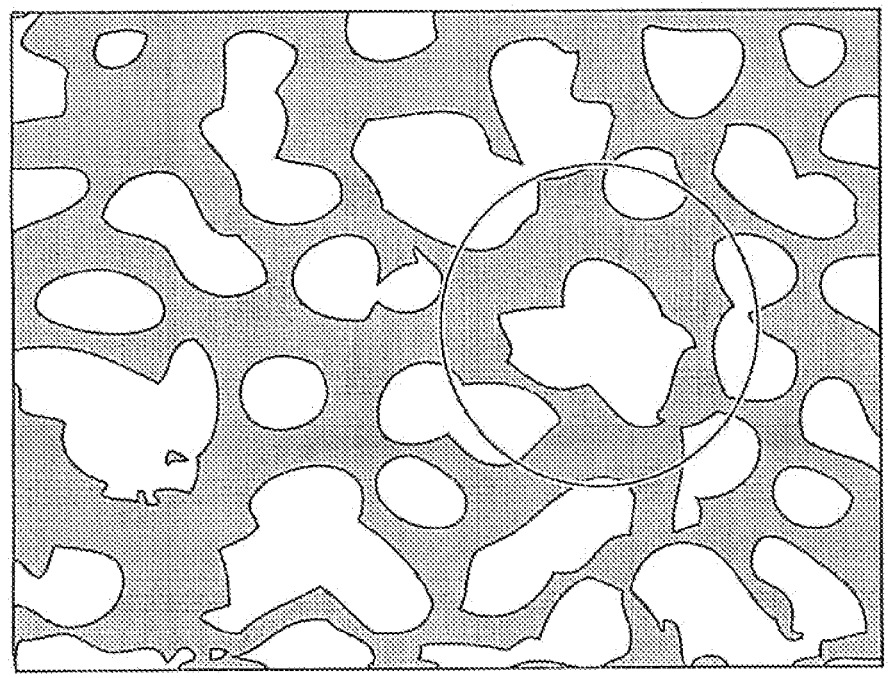
FIG. 38 is a planar schematic view showing an enlargement of the moth-eye film of Reference Example 2.

FIGS. 35 to 38 are photographs and schematic views showing an enlargement of the moth-eye film according to Reference Example 2. FIG. 35 is a sectional photograph, FIG. 36 is a sectional schematic view, FIG. 37 is a planar photograph, and FIG. 38 is a planar schematic view. As shown in FIGS. 35 and 36, the tip ends of the convex portions of the moth-eye film are bent, and adjacent tip ends of several convex portions are joined to each other to form a sticking structure. Further, in FIGS. 37 and 38, white parts indicate the convex portions of the moth-eye film, and many of the convex portions have a circular shape or an elliptical shape when seen from an orthogonal direction to the surface of the moth-eye film. On the other hand, the sticking structures formed when the tip ends of the convex portions are joined to each other may take a star shape extending radially from a center, a calabash shape or flower shape formed by overlapping a plurality of circles and/or ellipses, or an amorphous shape possessing no regularity, when seen from the orthogonal direction to the surface of the moth-eye film.

Figure 39:
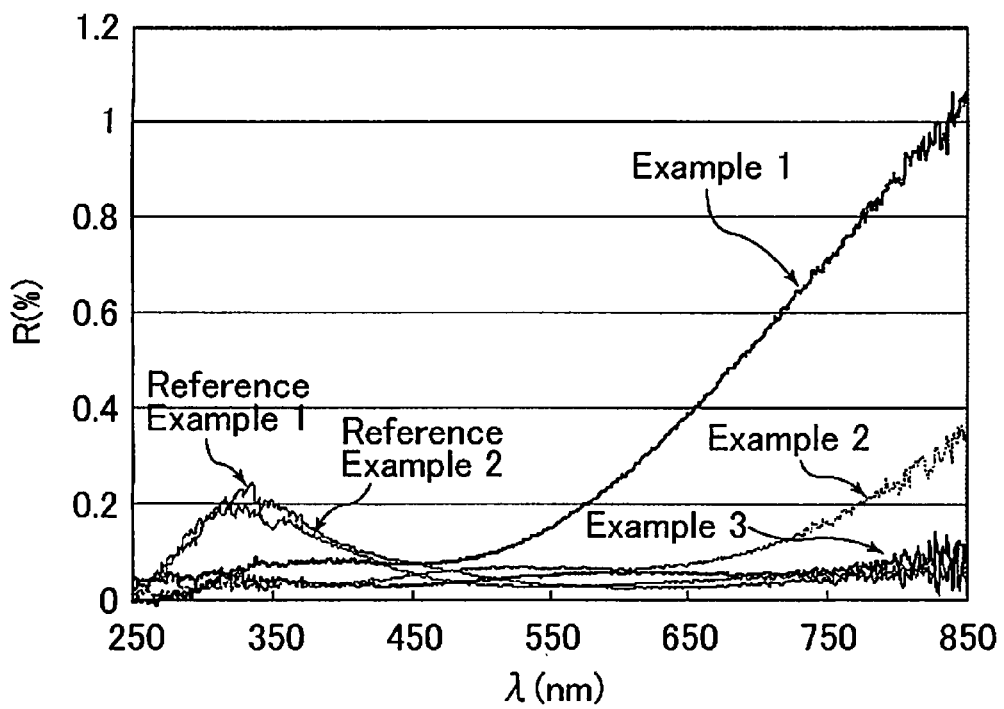
FIG. 39 is a graph showing reflection spectra of light reflected by the surfaces of the moth-eye films manufactured in Examples 1 to 3 and Reference Examples 1 and 2.

Next, characteristics of the moth-eye films manufactured in Examples 1 to 3 and Reference Examples 1 and 2 will be compared. FIG. 39 is a graph showing reflection spectra of light reflected by the surfaces of the moth-eye films manufactured in Examples 1 to 3 and Reference Examples 1 and 2.

As shown in FIG. 39, the moth-eye film according to Example 1 exhibits high reflectance relative to light on a longer wavelength side. More specifically, a reflectance increases rapidly from approximately 500 nm. The reason for this is that the aspect ratio of each convex portion in the moth-eye film according to Example 1 is small. A visible light range is 380 to 780 nm, and it can therefore be seen that although the reflectance does not exceed 1% within the visible light range, a red or yellow tint is likely to occur. Further, in the moth-eye film according to Example 2, the reflectance value increases slightly from approximately 650 nm, and similarly to the moth-eye film according to Example 1, the moth-eye film according to Example 2 exhibits high reflectance relative to light on the longer wavelength side.

Meanwhile, in the moth-eye films according to Reference Examples 1 and 2, the aspect ratio is large and therefore the reflectance is low relative to light on the long wavelength side. On a short wavelength side, however, an increase in the reflectance is observed. The reason for this may be that due to the sticking structures shown in FIGS. 27 to 34, scattering occurs in the light reflected on the surfaces of the moth-eye films.

Figure 40:
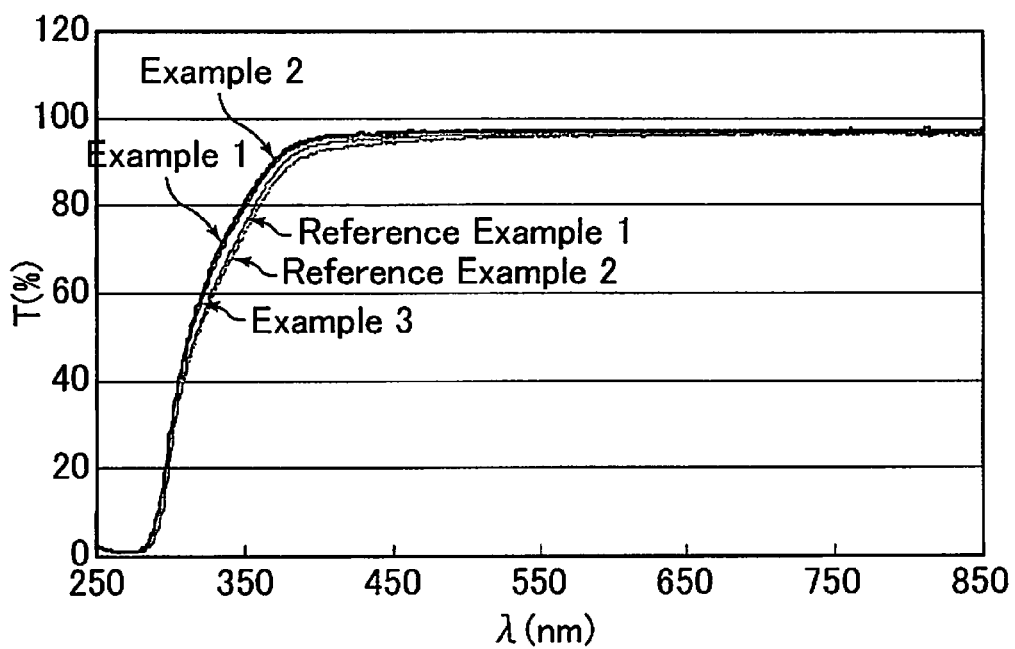
FIG. 40 is a graph showing transmission spectra of the light passed through the surfaces of the moth-eye films manufactured in Examples 1 to 3 and Reference Examples 1 and 2.

FIG. 40 is a graph showing transmission spectra of the light passed through the surfaces of the moth-eye films manufactured in Examples 1 to 3 and Reference Examples 1 and 2.

As shown in FIG. 40, similar transmittance curves are obtained with the moth-eye films according to Examples 1 to 3, but in the moth-eye films according to Reference Examples 1 and 2, the transmittance of the light decreases on the shorter wavelength side. The reason for this may be that due to the sticking structures, scattering occurs in the light passed through the moth-eye films.

Figure 41:
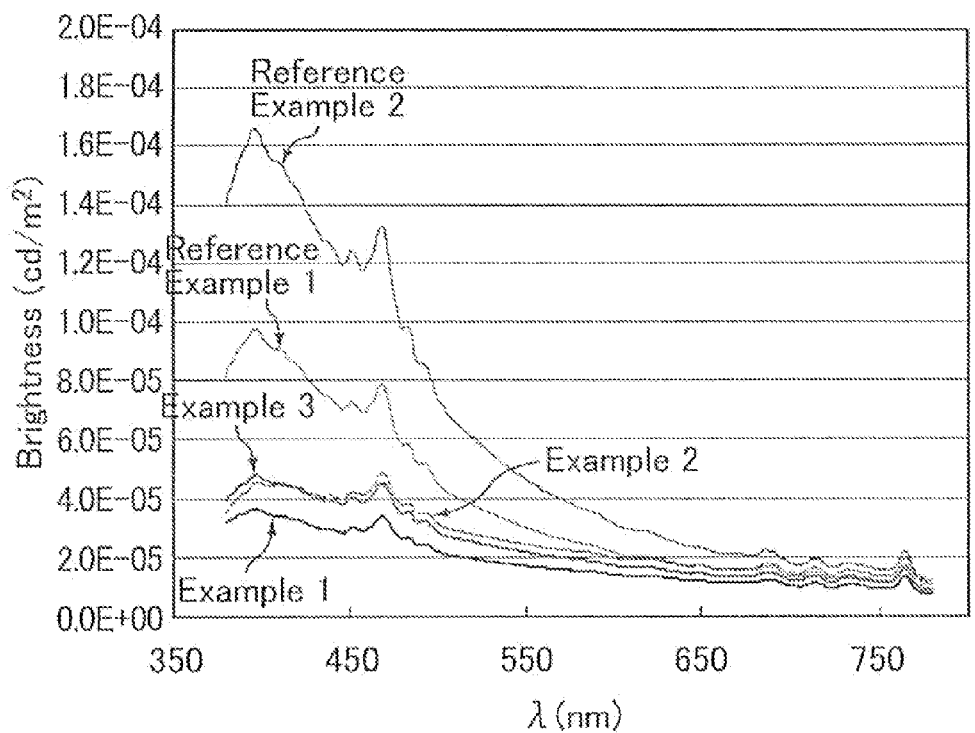
FIG. 41 is a graph showing scattering spectra of the light scattered on the surfaces of the moth-eye films manufactured in Examples 1 to 3 and Reference Examples 1 and 2.

FIG. 41 is a graph showing scattering spectra of the light scattered on the surfaces of the moth-eye films manufactured in Examples 1 to 3 and Reference Examples 1 and 2. As shown in FIG. 41, in the moth-eye films according to Reference Examples 1 and 2 in particular, the brightness increases on the shorter wavelength side, and it is to be understood that a scattering component generated by the sticking structures causes increase in brightness.

Figure 42:
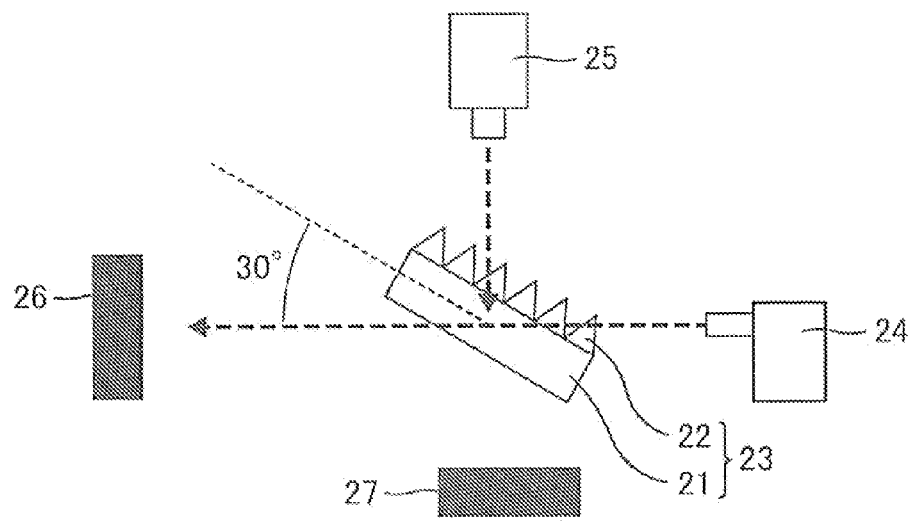
FIG. 42 is a conceptual view showing an evaluation system for evaluating a scattering characteristic of light reflected on a surface of a moth-eye film.

The scattering spectra were measured as follows. FIG. 42 is a conceptual view showing an evaluation system for evaluating a scattering characteristic of light reflected on a surface of a moth-eye film.

As shown in FIG. 42, a test subject 23 is a stacked body including a transparent acrylic plate (a base) 21 and a moth-eye film 22 disposed on the transparent acrylic plate 21. To perform a measurement, a light source 24 was disposed in a direction forming an angle of 30° relative to a front surface side (a side on which the concave-convex shape was formed) of the moth-eye film 22, or in other words a main surface of the moth-eye film 22, whereupon light was emitted onto the main surface of the moth-eye film 22 from the 30° direction. A black absorber 26 facing an advancement direction of the light was disposed on a propagation line of the light on an opposite side of the moth-eye film to the light source 24. Further, a brightness gauge 25 and an absorber 27 were disposed in an orthogonal direction to the light source 24 and the black absorber 26, or in other words a direction that is orthogonal to the advancement direction of the light and 60° relative to the main surface of the moth-eye film 22. Hence, the brightness gauge 25 and the absorber 27 were disposed in mutually opposing positions about the moth-eye film 22 such that a measurement direction of the brightness gauge 25 and the absorber 27 oppose each other. The brightness gauge 25 was disposed on the front surface side of the moth-eye film 22, while the absorber 27 was disposed on a rear surface side of the moth-eye film 22.

Of the two absorbers 26, 27, the absorber 26 positioned on the propagation line of the light on the opposite side of the moth-eye film 22 to the light source serves to absorb light (transmitted light) that passes through the moth-eye film 22 as is after the scattering component is removed from the light incident on the moth-eye film 22. Further, both the absorber 26 and the absorber 27 that has a main surface opposing the measurement direction of the brightness gauge 25 serve to absorb a component of the light scattered on the surface of the moth-eye film 22 that is scattered toward the rear surface side of the moth-eye film 22, from which a component scattered toward the front surface side of the moth-eye film 22 has been removed.

An SR-UL1 (manufactured by Topcon Techno House Corporation) was used as the brightness gauge 25. Measurement conditions were set such that a measurement angle with a 2.0° viewing field was obtained and a distance from the test subject 23 was 40 cm. The light that passed to the rear surface side of the moth-eye film 22 was absorbed by the absorber 26 and the absorber 27. It was therefore possible with this measurement system to measure the amount of light (a reflected/scattered light amount) scattered on the surface of the moth-eye film 22 so as to advance to the rear surface side of the moth-eye film 22.

A xenon lamp (MC-961C, manufactured by Otsuka Electronics Co., Ltd.) was used as the light source 24. Measurement conditions were set such that an illuminance of 3000 Lx was obtained and the distance to the test subject was set at 15 cm.

Next, moth-eye films were manufactured using similar molds (the molds 1 to 4) to those of Examples 1 to 3 and Reference Example 1 but after changing the resin material of the moth-eye film 22 to different resins (resins A to D) to that of Examples 1 to 3 and Reference Examples 1 and 2.

The resins A to D are all acrylate UV-curable monomers or oligomers (from the KAYARAD series manufactured by Nippon Kayaku Co., Ltd.), but differ from each other in property values such as a dynamic storage elastic modulus (E'), a dynamic loss elastic modulus (E"), and a glass transition temperature (Tg).

Further, the storage elastic modulus (E'), the loss elastic modulus (E"), and a temperature variation of tan δ of the resins A to D were respectively measured using a dynamic viscoelasticity measurement device DMS6100 (manufactured by Seiko Instruments Inc.).

Figure 43:
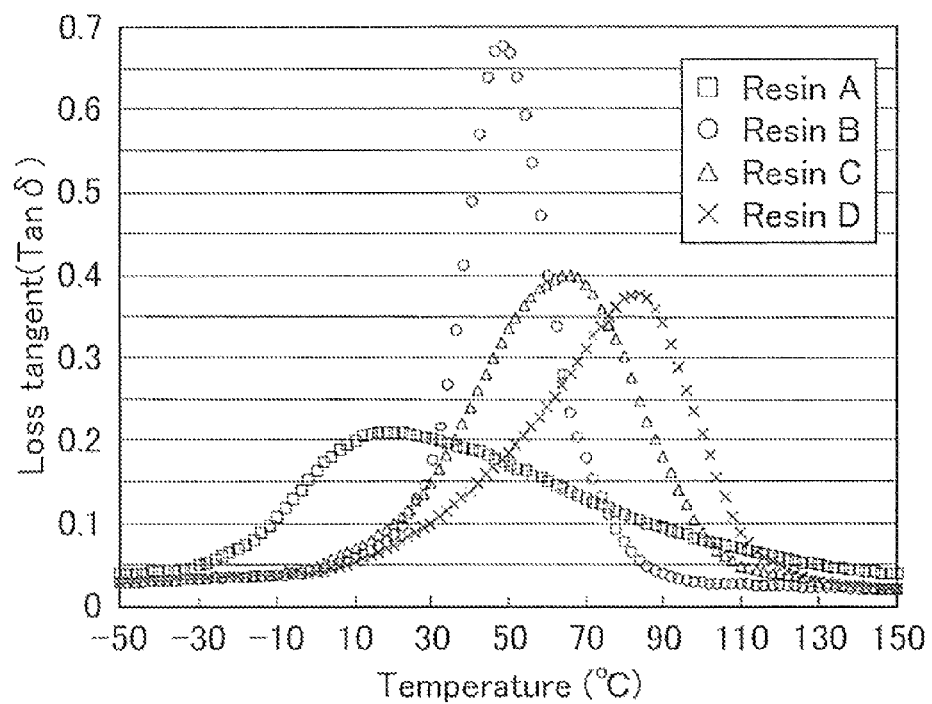
FIG. 43 is a graph showing a temperature dependency of tan δ in resins A to D.

FIG. 43 is a graph showing a temperature dependency of tan δ of the resins A to D. Tan δ (a loss tangent) is a value (E'/E") calculated from the dynamic storage elastic modulus (E') and the dynamic loss elastic modulus (E"). The dynamic storage elastic modulus (E') and the dynamic loss elastic modulus (E") are values measured using the dynamic viscoelasticity measurement device DMS6100 and a method conforming to JIS K-7244 under the following conditions: sample dynamic amplitude velocity (drive frequency) 1 Hz; tensile mode; inter-chuck distance 5 mm; strain amplitude 10 μm; force amplitude initial value 100 mN; and temperature increase rate 2° C./min. Further, as a general rule, a temperature indicating a local maximum value of tan δ on each curve corresponds to the glass transition temperature (Tg).

As shown in FIG. 43, values on the curves indicating the temperature dependency of tan δ of the resins A to D all vary in accordance with the temperature such that the resins A to D all have mountain-shaped curves. The curves representing the resins A to D differ from each other in an incline angle, a temperature at a local maximum value, a size of the local maximum value, and a half width relative to the local maximum value.

The incline angle of tan δ was gentlest in the resin A, steeper in the resin D, much steeper in the resin C, and steepest in the resin B. The temperature at the local maximum value of tan δ, or in other words the glass transition temperature (Tg), was 48° C. in the resin B, 66° C. in the resin C, and 84° C. in the resin D. Note that the resin A did not exhibit a clear Tg value. However, the temperature of the resin A at the local maximum value of tan δ was 18° C. The local maximum value of tan δ was 0.21 in the resin A, 0.68 in the resin B, 0.40 in the resin C, and 0.38 in the resin D. In other words, the size of the local maximum value of tan δ was smallest in the resin A, larger in the resin D, much larger in the resin C, and largest in the resin B.

The half width relative to the local maximum value, or in other words, a temperature range extending from half the value of the local maximum value to the local maximum value, when assuming the local maximum value of tan δ as a reference value, was 92° C. in the resin A, whereby symmetry on the graph of tan δ was lacking, 26° C. in the resin B, 52° C. in the resin C, and 52° C. in the resin D. In other words, the half width relative to the local maximum value was largest in the resin A, smaller in the resin D, much smaller in the resin C, and smallest in the resin B. With regard to the resin A, the symmetry of tan δ peaks was lacking and a clear Tg value was not obtained. Here, "a case in which the symmetry of the tan δ graph is lacking and a clear Tg value is not obtained" is defined as a case in which the half width is divided between a low temperature side and a high temperature side about the temperature at the local maximum value of tan δ, and one of the temperature ranges of a low temperature side region and a high temperature side region is at least double the other. The temperature ranges of the low temperature side region and the high temperature side region of the half width with regard to the respective resins are 28° C. and 64° C. in the resin A, 12° C. and 14° C. in the resin B, 30° C. and 22° C. in the resin C, and 34° C. and 18° C. in the resin D.

Figure 44:
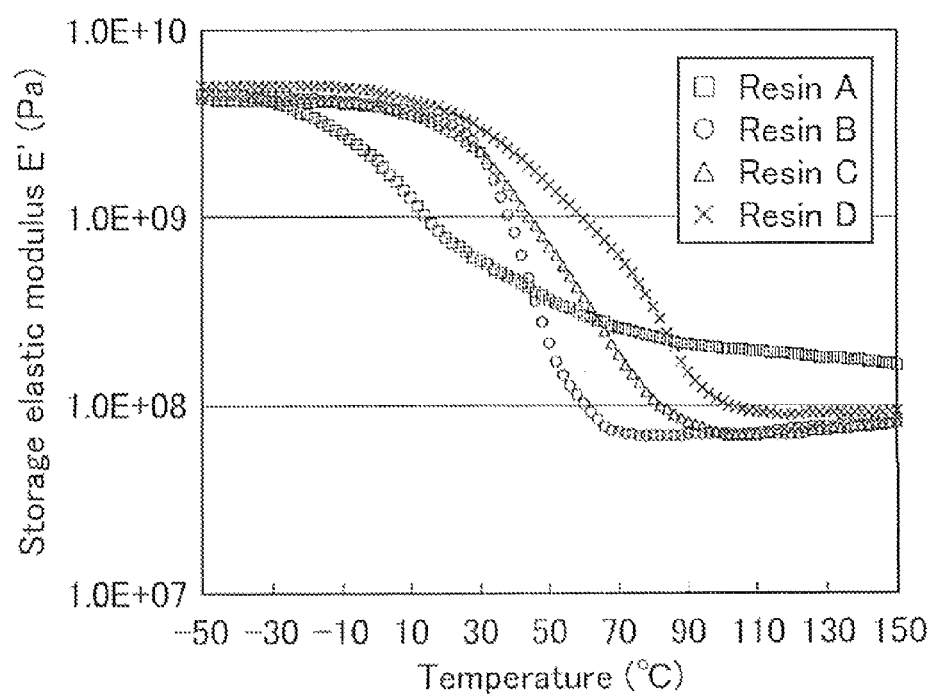
FIG. 44 is a graph showing the temperature dependency of a dynamic storage elastic modulus (E') of the resins A to D.

FIG. 44 is a graph showing the temperature dependency of the dynamic storage elastic modulus (E') of the resins A to D. As shown in FIG. 44, all of the curves representing the temperature dependency of the dynamic storage elastic modulus (E') of the resins A to D fall gently as the temperature increases but vary little in response to a temperature increase at or above a fixed temperature. However, the curves differ from each other in the angle of incline.

A differential coefficient within a range extending from a variation start point to a variation end point on the curves representing the dynamic storage elastic modulus (E') of the resins A to D was $-7.9 \times 10^{-7}$ in the resin A, $-1.7 \times 10^{-8}$ in the resin B, $-9.6 \times 10^{-7}$ in the resin C, and $-8.2 \times 10^{-7}$ in the resin D. In other words, the angle of incline of the curves representing the dynamic storage elastic modulus (E') was gentlest in the resin A, steeper in the resin D, much steeper in the resin C, and steepest in the resin B.

Figure 45:
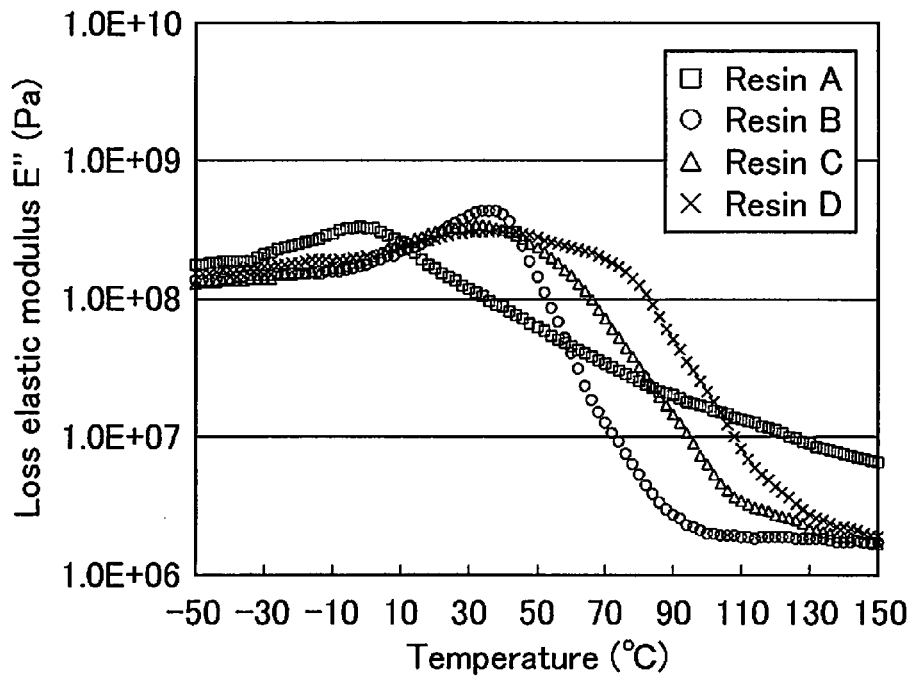
FIG. 45 is a graph showing the temperature dependency of a dynamic loss elastic modulus (E") of the resins A to D.

FIG. 45 is a graph showing the temperature dependency of the dynamic loss elastic modulus (E") of the resins A to D. As shown in FIG. 45, all of the curves representing the temperature dependency of the dynamic loss elastic modulus (E") of the resins A to D undulate but as a whole fall gently as the temperature increases. However, the curves differ from each other in the angle of incline. Overall, the angle of incline of the curves representing the dynamic loss elastic modulus (E") was gentlest in the resin A, steadily steeper in the resins D and C, and steepest in the resin B.

(Evaluation Test 1)

Moth-eye films were manufactured from the resins A to D using the mold 1 and set respectively as moth-eye films according to Examples 4 to 7. The resin A corresponds to Example 4, the resin B corresponds to Example 5, the resin C corresponds to Example 6, and the resin D corresponds to Example 7.

Figure 46:
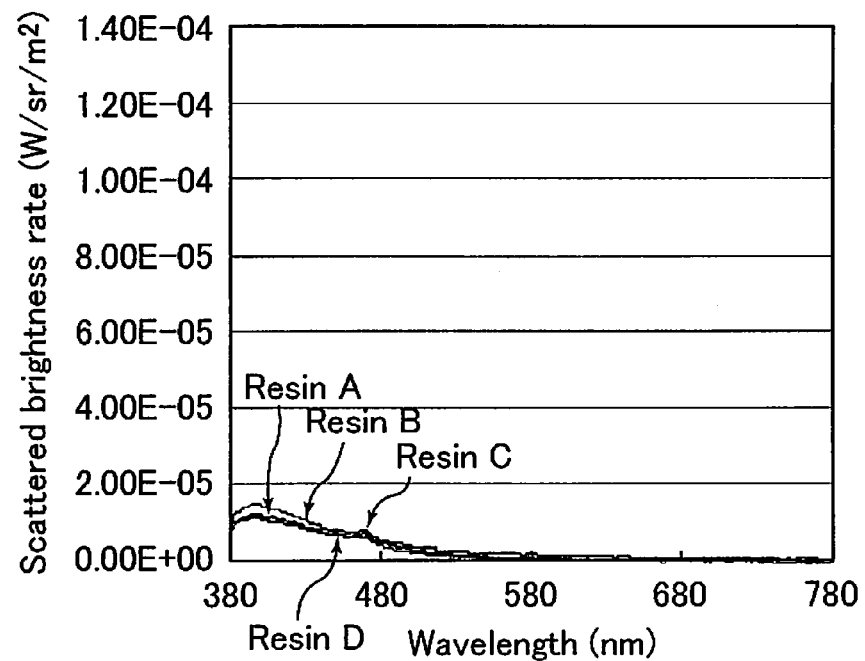
FIG. 46 is a graph showing scattering spectra of light scattered on surfaces of moth-eye films according to Examples 4 to 7, and illustrating scattering spectra based on an absolute value (W/sr/m$^2$) of a scattered brightness (radiance)
Figure 47:
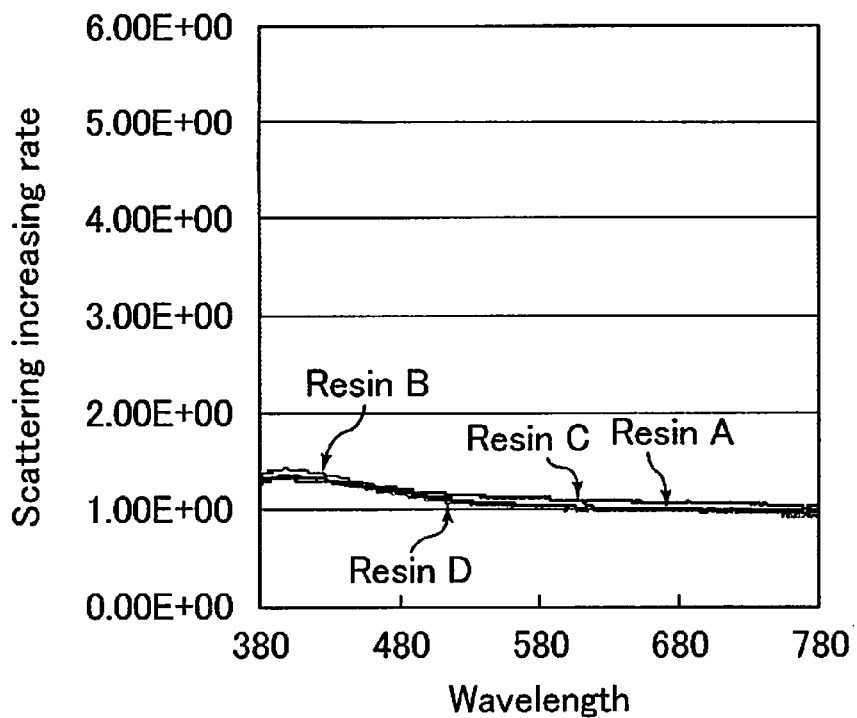
FIG. 47 is a graph showing the scattering spectra of the light scattered on the surfaces of the moth-eye films according to Examples 4 to 7, and illustrating scattering spectra based on an increase rate of the scattered brightness (radiance)

FIGS. 46 and 47 are graphs showing scattering spectra of light scattered on the surfaces of the moth-eye films according to Examples 4 to 7. FIG. 46 illustrates scattering spectra based on an absolute value (W/sr/m²) of a scattered brightness (radiance), while FIG. 47 illustrates scattering spectra based on an increase rate of the scattered brightness (radiance). An ordinate of the graph shown in FIG. 46 shows the absolute value of the radiance generated when the light reflected on the surface of the moth-eye film is scattered, or in other words a value obtained by subtracting (removing) an absolute value of radiance generated when light is scattered on the surface of an acrylic plate (base) from a value of radiance generated when light is scattered on a test subject surface in a condition where a moth-eye film is provided on the acrylic plate (base). An ordinate of the graph shown in FIG. 47 shows an increase rate of the radiance generated when light is scattered on the surface of the test subject surface provided with the moth-eye film relative to the radiance generated when the light reflected by the surface of the acrylic plate (base) is scattered, or in other words when light is scattered on the test subject surface not provided with the moth-eye film. The same method to that described above with reference to FIG. 42 was used to measure the radiance.

As shown in FIGS. 46 and 47, in all of the moth-eye films formed from the resins A to D using the mold 1, great variation did not occur in the scattering spectra of the light scattered on the surfaces of the moth-eye films. It can therefore be seen that with the moth-eye films according to Examples 4 to 7, light scattering caused by sticking structures did not occur.

(Evaluation Test 2)

Moth-eye films were manufactured from the resins A to D using the mold 2 and set respectively as moth-eye films according to Examples 8 to 11. The resin A corresponds to Example 8, the resin B corresponds to Example 9, the resin C corresponds to Example 10, and the resin D corresponds to Example 11.

Figure 48:
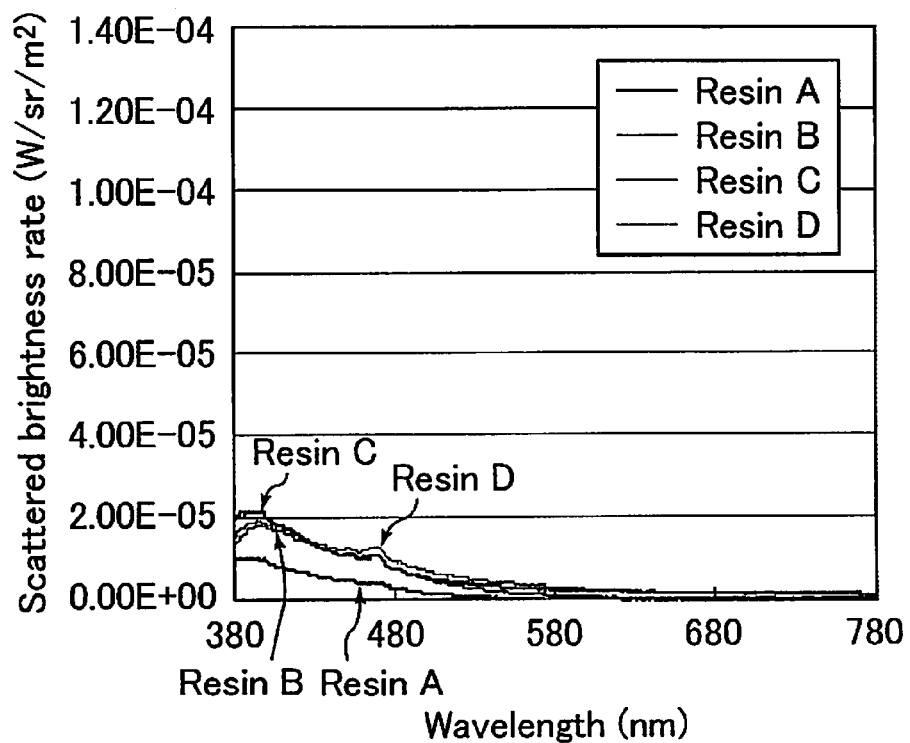
FIG. 48 is a graph showing scattering spectra of light scattered on surfaces of moth-eye films according to Examples 8 to 11, and illustrating scattering spectra based on the absolute value of the scattered brightness (radiance)
Figure 49:
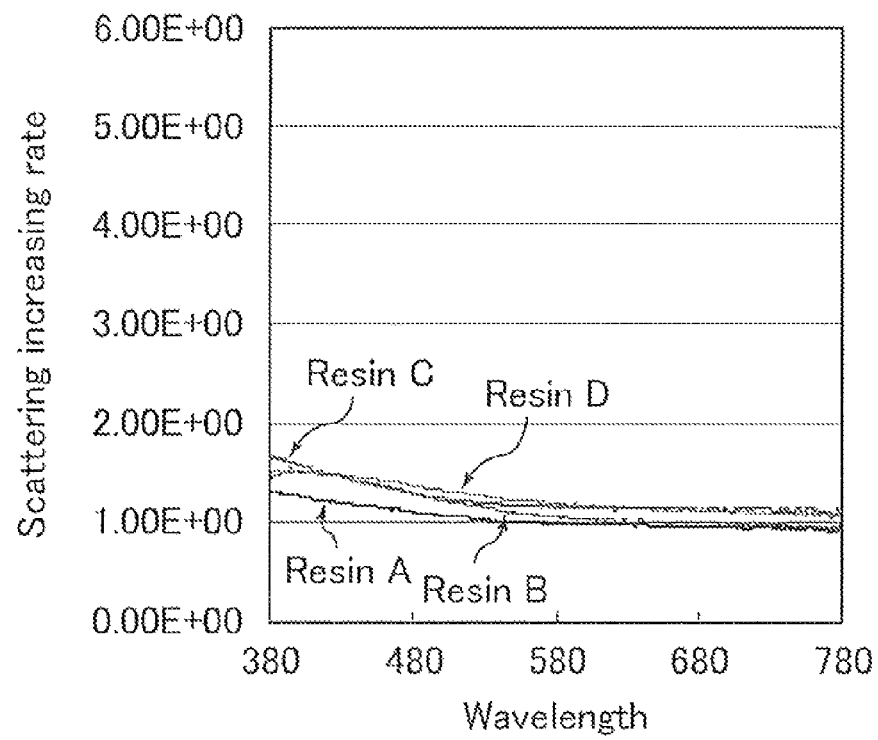
FIG. 49 is a graph showing the scattering spectra of the light scattered on the surfaces of the moth-eye films according to Examples 8 to 11, and illustrating scattering spectra based on the increase rate of the scattered brightness (radiance)

FIGS. 48 and 49 are graphs showing scattering spectra of light scattered on the surfaces of the moth-eye films according to Examples 8 to 11. Similarly to FIGS. 46 and 47, FIG. 48 illustrates scattering spectra based on the absolute value of the scattered brightness (radiance) and FIG. 49 illustrates scattering spectra based on the increase rate of the scattered brightness (radiance). The same method to that described above with reference to FIG. 42 was used to measure the scattering spectra.

As shown in FIGS. 48 and 49, in all of the moth-eye films formed from the resins A to D using the mold 2, great variation did not occur in the scattering spectra of the light scattered on the surfaces of the moth-eye films.

Figure 50:
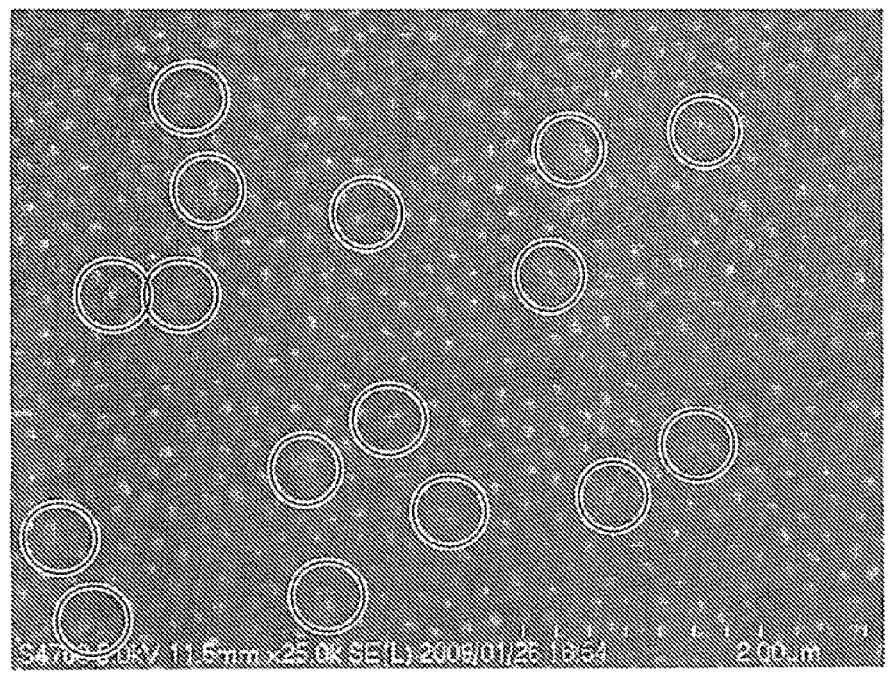
FIG. 50 is a planar photograph of the moth-eye film manufactured in Example 9.
Figure 51:
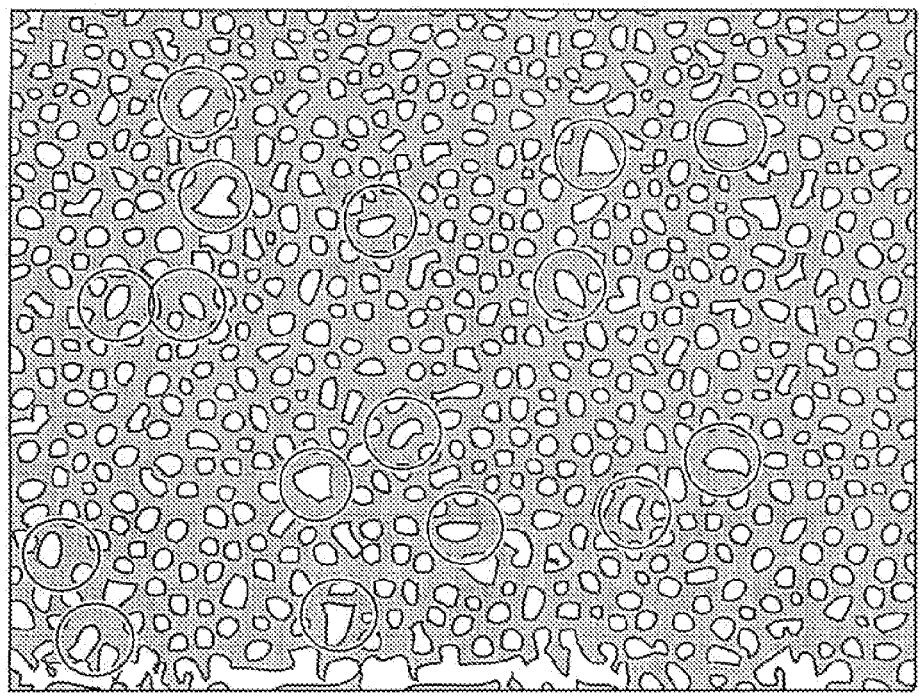
FIG. 51 is a planar schematic view of the moth-eye film manufactured in Example 9.
Figure 52:
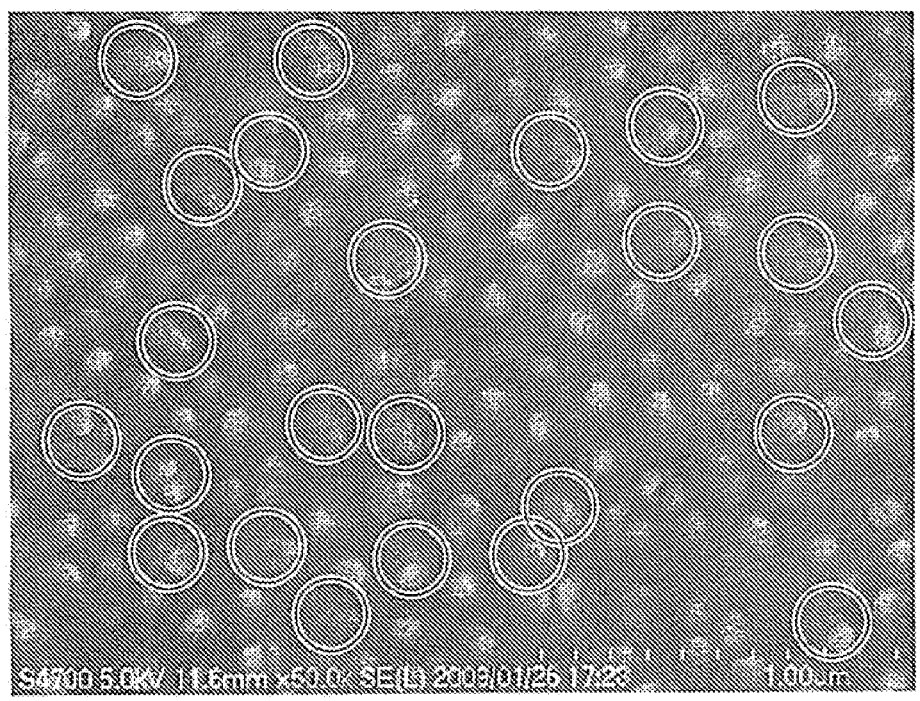
FIG. 52 is a planar photograph of the moth-eye film manufactured in Example 10.
Figure 53:
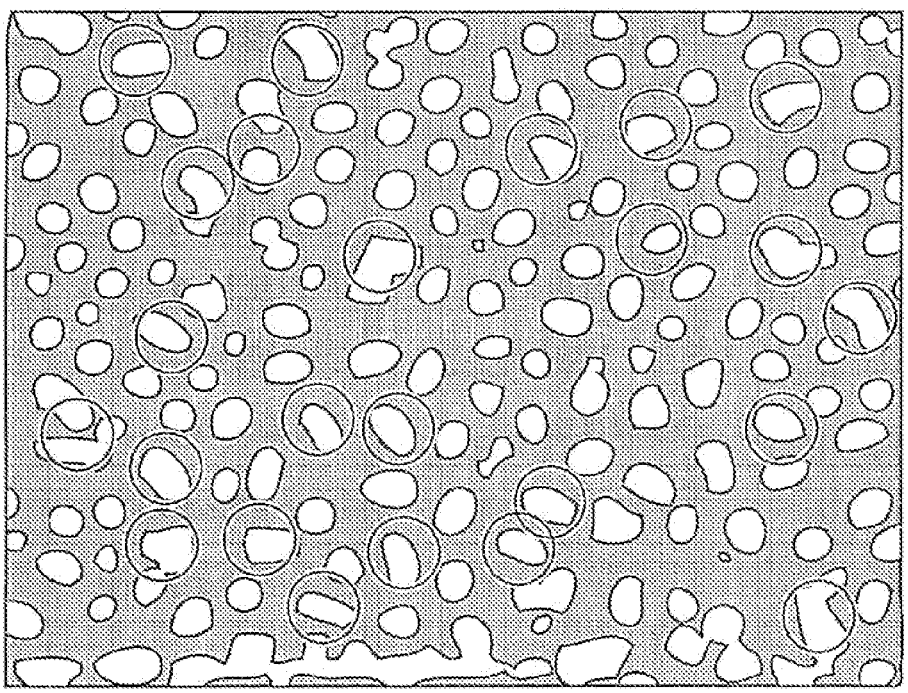
FIG. 53 is a planar schematic view of the moth-eye film manufactured in Example 10.
Figure 54:
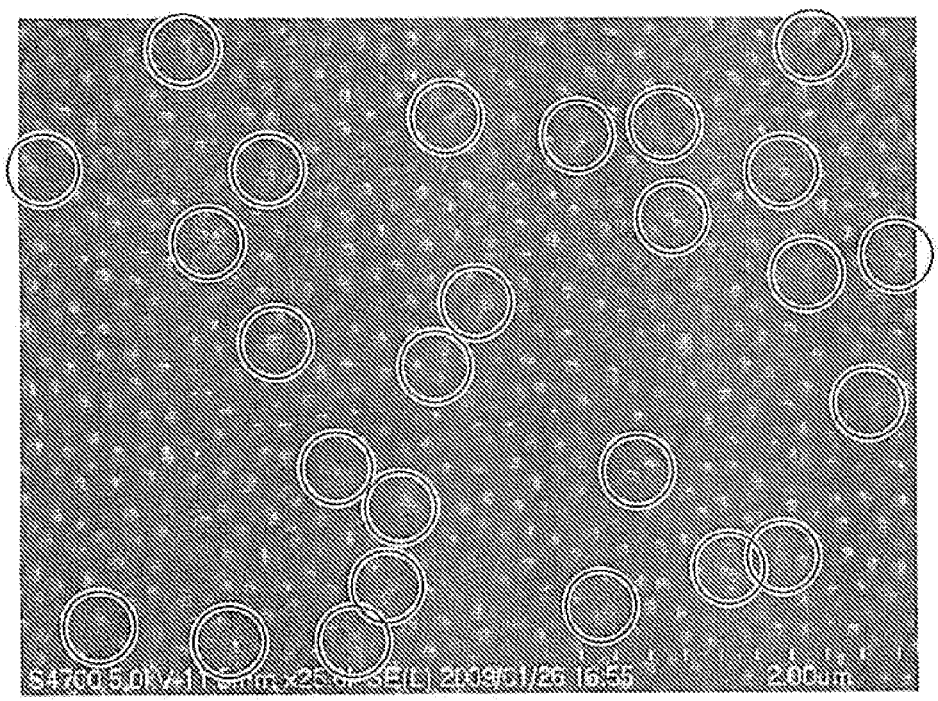
FIG. 54 is a planar photograph of the moth-eye film manufactured in Example 11.
Figure 55:
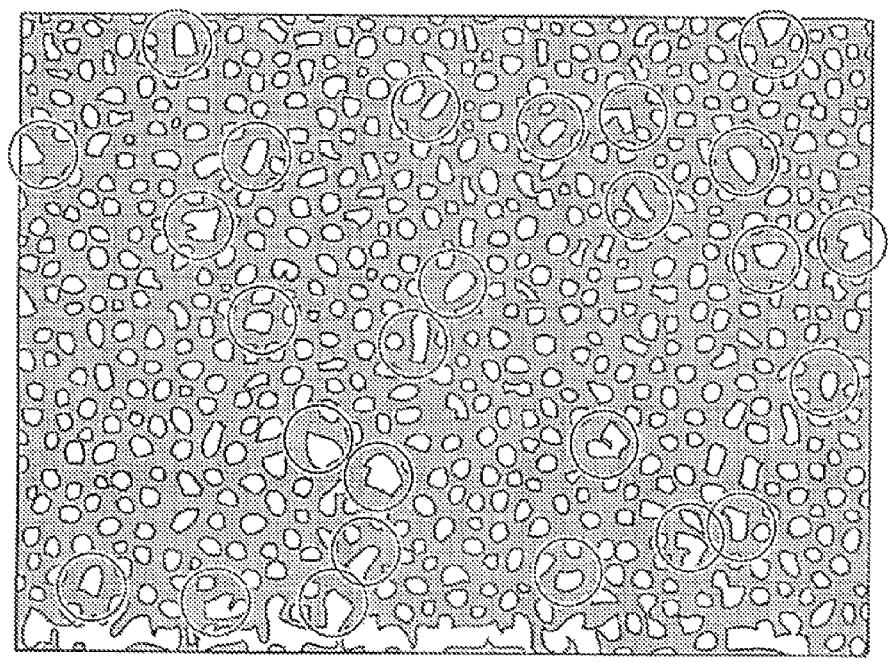
FIG. 55 is a planar schematic view of the moth-eye film manufactured in Example 11.

FIGS. 50 to 55 show the moth-eye films manufactured in Examples 9 to 11. FIGS. 50, 52 and 54 are planar photographs, and FIGS. 51, 53 and 55 are planar schematic views. FIGS. 50 and 51 correspond to Example 9, FIGS. 52 and 53 correspond to Example 10, and FIGS. 54 and 55 correspond to Example 11. Parts surrounded by circles in FIGS. 50 to 55 indicate sticking structures having a diameter of at least 0.3 μm, formed when the tip end portions of the convex portions are joined to each other. The density of the number of sticking structures was $0.8/\mu m^2$ in the moth-eye film shown in FIGS. 50 and 51, $1.2/\mu m^2$ in the moth-eye film shown in FIGS. 52 and 53, and $1.3/\mu m^2$ in the moth-eye film shown in FIGS. 54 and 55.

It can therefore be seen that light scattering caused by sticking structures did not occur in the moth-eye films according to Examples 8 to 11.

(Evaluation Test 3)

Moth-eye films were manufactured from the resins A to D using the mold 3 and set respectively as moth-eye films according to Examples 12 to 14 and Reference Example 3. The resin A corresponds to Example 12, the resin B corresponds to Reference Example 3, the resin C corresponds to Example 13, and the resin D corresponds to Example 14.

Figure 56:
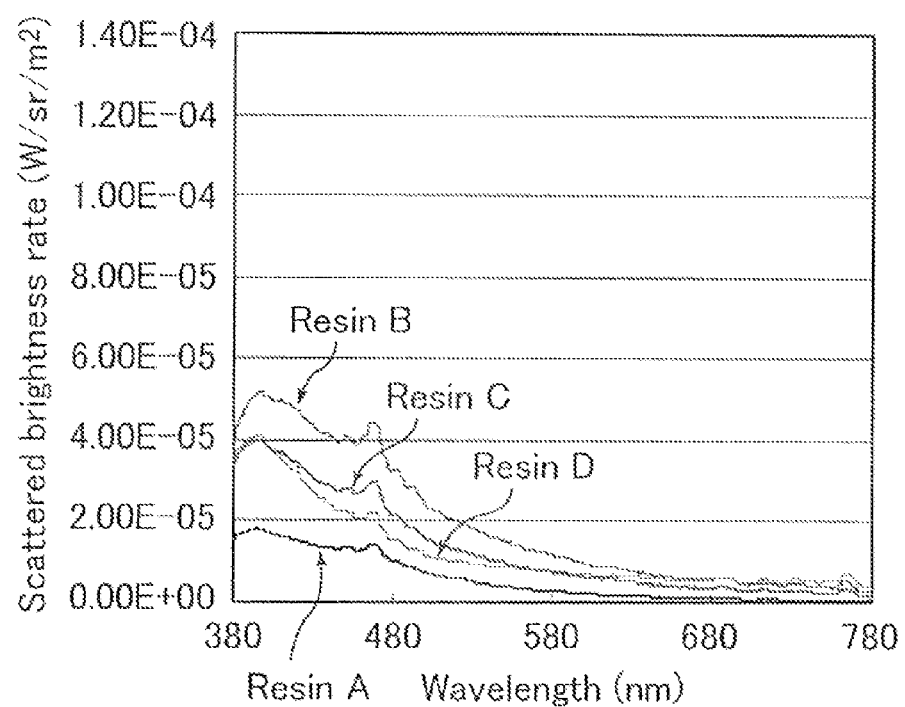
FIG. 56 is a graph showing scattering spectra of light scattered on surfaces of moth-eye films according to Examples 12 to 14 and Reference Example 3, and illustrating scattering spectra based on the absolute value of the scattered brightness (radiance)
Figure 57:
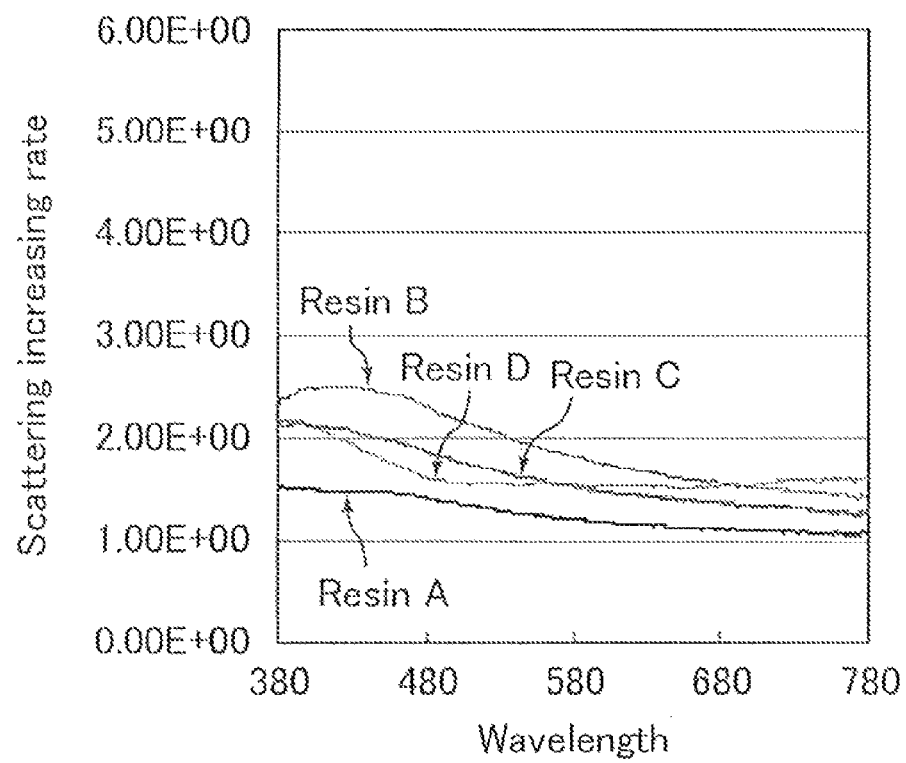
FIG. 57 is a graph showing the scattering spectra of the light scattered on the surfaces of the moth-eye films according to Examples 12 to 14 and Reference Example 3, and illustrating scattering spectra based on the increase rate of the scattered brightness (radiance)

FIGS. 56 and 57 are graphs showing scattering spectra of light scattered on the surfaces of the moth-eye films according to Examples 12 to 14 and Reference Example 3. FIG. 56 illustrates scattering spectra based on the absolute value of the scattered brightness (radiance) and FIG. 57 illustrates scattering spectra based on the increase rate of the scattered brightness (radiance). The same method to that described above with reference to FIG. 42 was used to measure the scattering spectra.

As shown in FIGS. 56 and 57, although great variation did not occur in the scattering spectra of the light scattered on the surface of the moth-eye film according to Example 12, variation was observed in the amount of light scattered on the surfaces of the moth-eye films according to Examples 13 and 14 and Reference Example 3. More specifically, an increase in brightness was observed on the shorter wavelength side in the moth-eye films according to Examples 13 and 14 and Reference Example 3, and a particularly large increase in reflectance was observed in the moth-eye film according to Reference Example 3 in comparison with the moth-eye films according to Examples 13 and 14.

Figure 58:
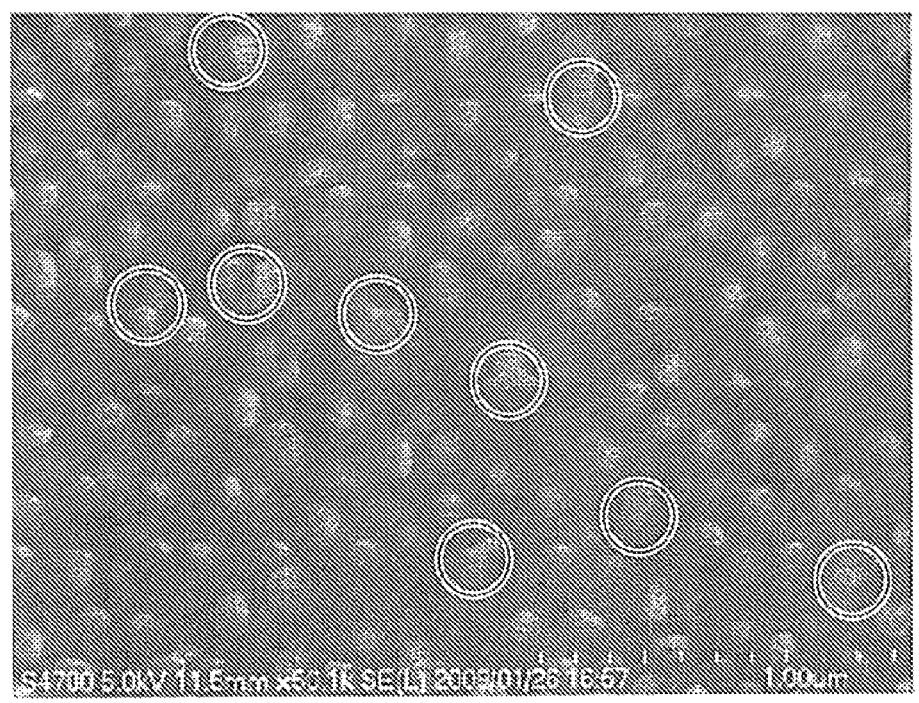
FIG. 58 is a planar photograph of the moth-eye film manufactured in Example 14.
Figure 59:
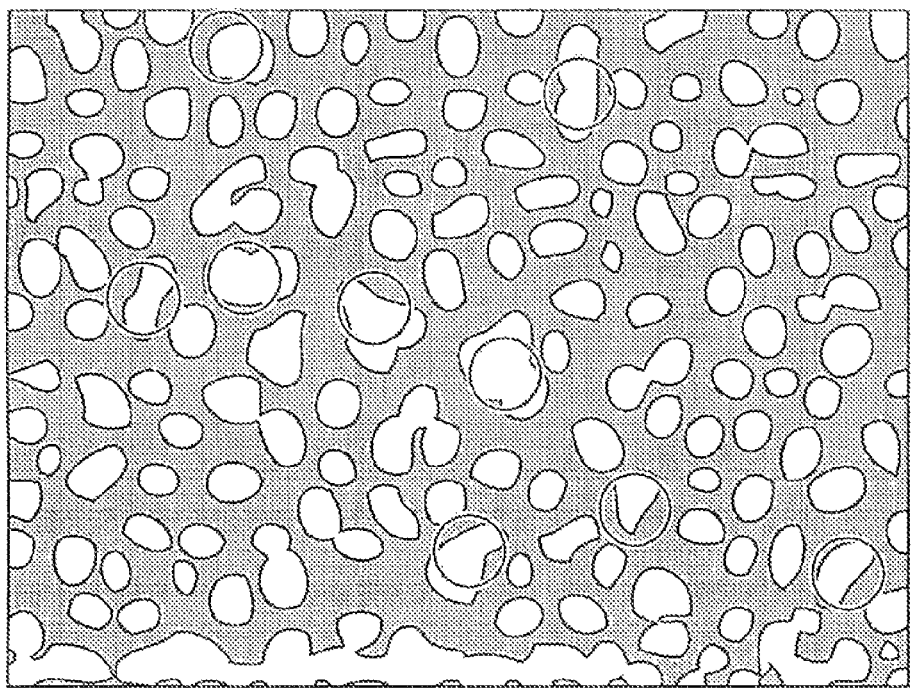
FIG. 59 is a planar schematic view of the moth-eye film manufactured in Example 14.
Figure 60:
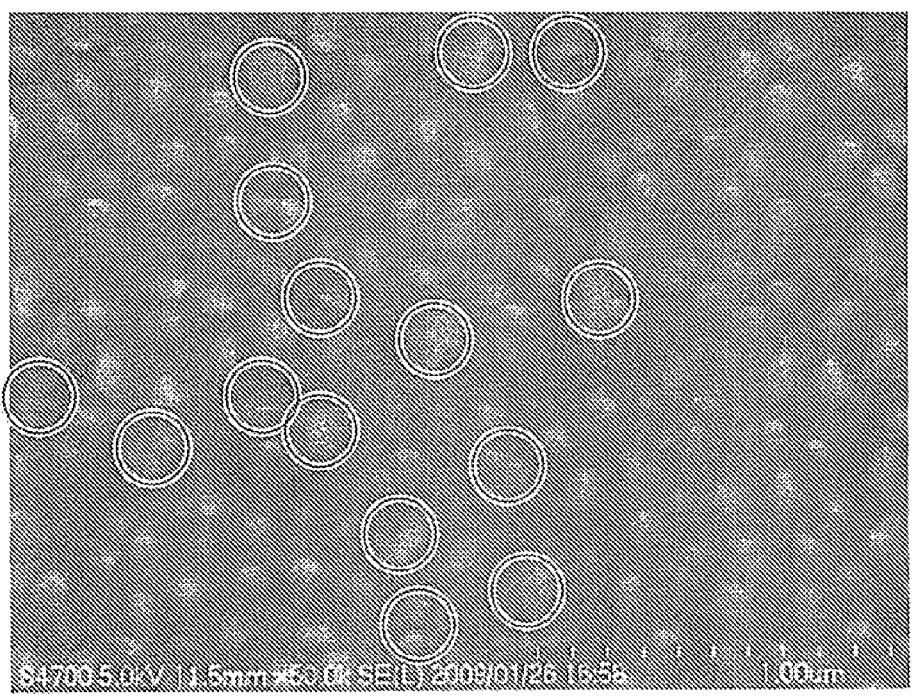
FIG. 60 is a planar photograph of the moth-eye film manufactured in Reference Example 3.
Figure 61:
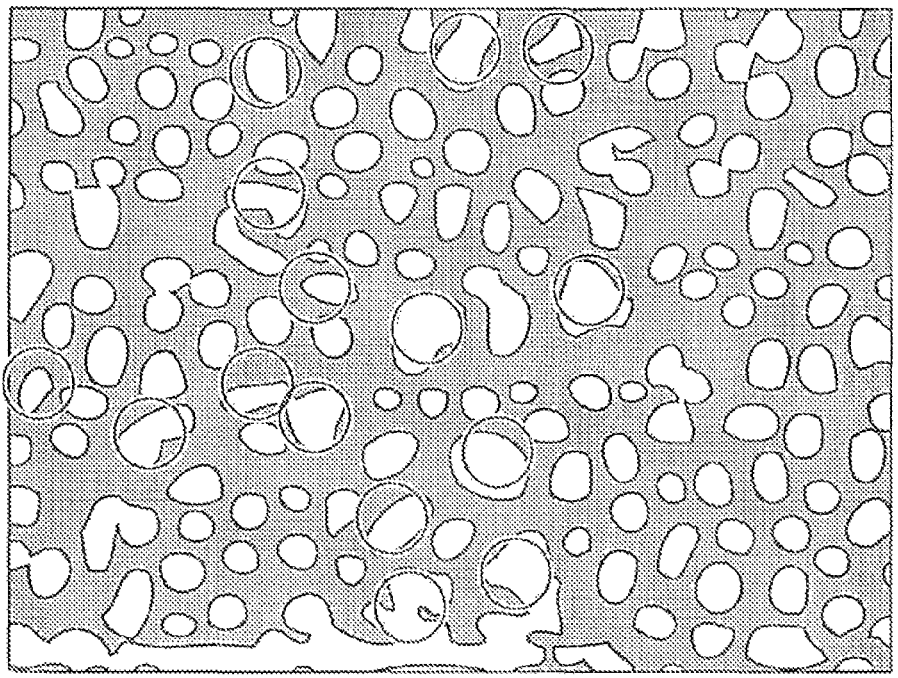
FIG. 61 is a planar schematic view of the moth-eye film manufactured in Reference Example 3.

FIGS. 58 to 61 show the moth-eye films manufactured in Example 14 and Reference Example 3. FIGS. 58 and 59 correspond to Example 14, and FIGS. 60 and 61 correspond to Reference Example 3. Parts surrounded by circles in FIGS. 58 to 61 indicate sticking structures having a diameter of at least 0.3 μm, formed when the tip end portions of the convex portions are joined to each other. The density of the number of sticking structures was $1.9/\mu m^2$ in the moth-eye film shown in FIGS. 58 and 59 and $3.1/\mu m^2$ in the moth-eye film shown in FIGS. 60 and 61.

It can therefore be seen that when moth-eye films were formed using the mold 3, light scattering caused by sticking structures did not occur in the moth-eye film formed from the resin A. However, when the resins B or C were used, slight light scattering caused by small sticking structures occurred, and when the resin D was used, light scattering caused by sticking structures occurred.

(Evaluation Test 4)

Moth-eye films were manufactured from the resins A to D using the mold 4 and set respectively as moth-eye films according to Reference Examples 4 to 7. The resin A corresponds to Reference Example 4, the resin B corresponds to Reference Example 5, the resin C corresponds to Reference Example 6, and the resin D corresponds to Reference Example 7.

Figure 62:
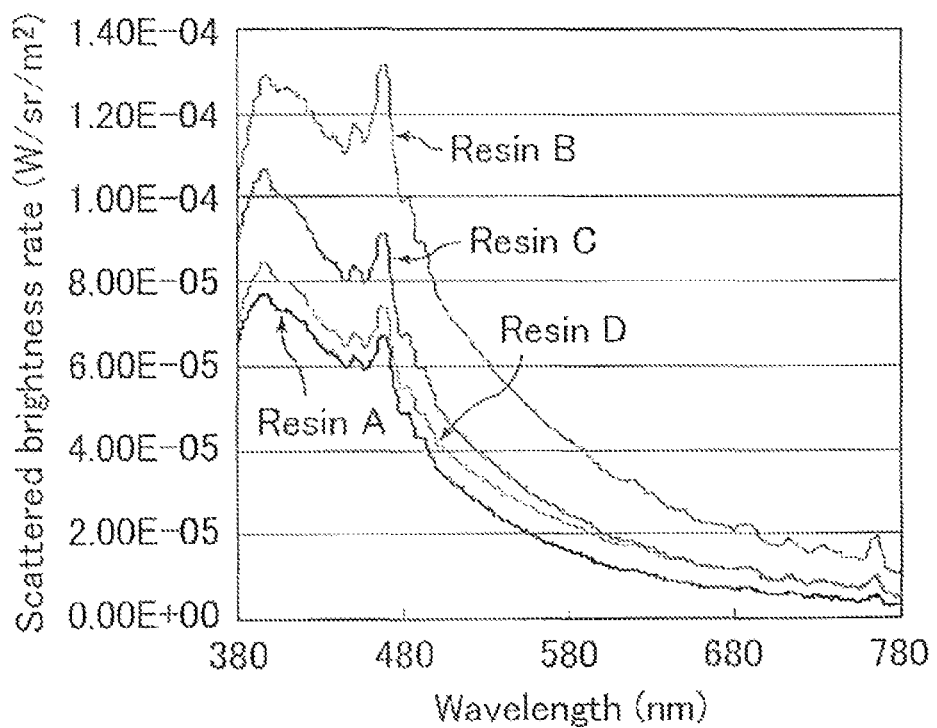
FIG. 62 is a graph showing scattering spectra of light scattered on the surfaces of moth-eye films according to Reference Examples 4 to 7, and illustrating scattering spectra based on the absolute value of the scattered brightness (radiance)
Figure 63:
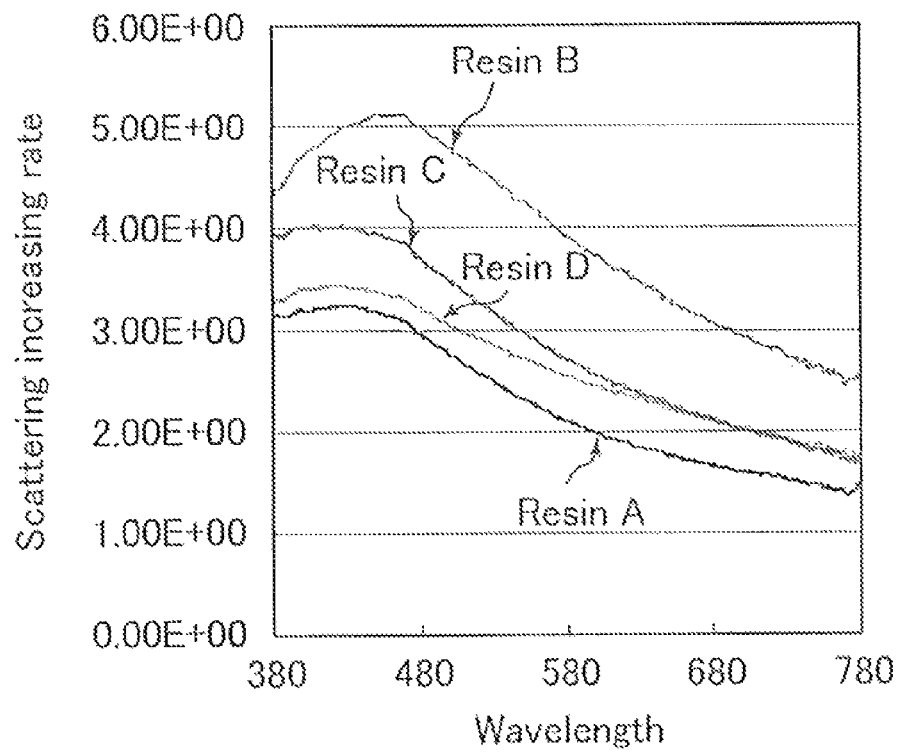
FIG. 63 is a graph showing the scattering spectra of the light scattered on the surfaces of the moth-eye films according to Reference Examples 4 to 7, and illustrating scattering spectra based on the increase rate of the scattered brightness (radiance)

FIGS. 62 and 63 are graphs showing scattering spectra of light scattered on the surfaces of the moth-eye films according to Reference Examples 4 to 7. FIG. 62 illustrates scattering spectra based on the absolute value of the scattered brightness (radiance) and FIG. 63 illustrates scattering spectra based on the increase rate of the scattered brightness (radiance).

As shown in FIGS. 62 and 63, variation was observed in the amount of light scattered on the surfaces of the moth-eye films according to all of Reference Examples 4 to 7. More specifically, an increase in brightness was observed on the shorter wavelength side in all of the moth-eye films, and in comparison with the results relating to the moth-eye film according to Reference Example 3, obtained in Evaluation Test 3, greater brightness was detected in all of the moth-eye films according to Reference Examples 4 to 7.

Figure 64:
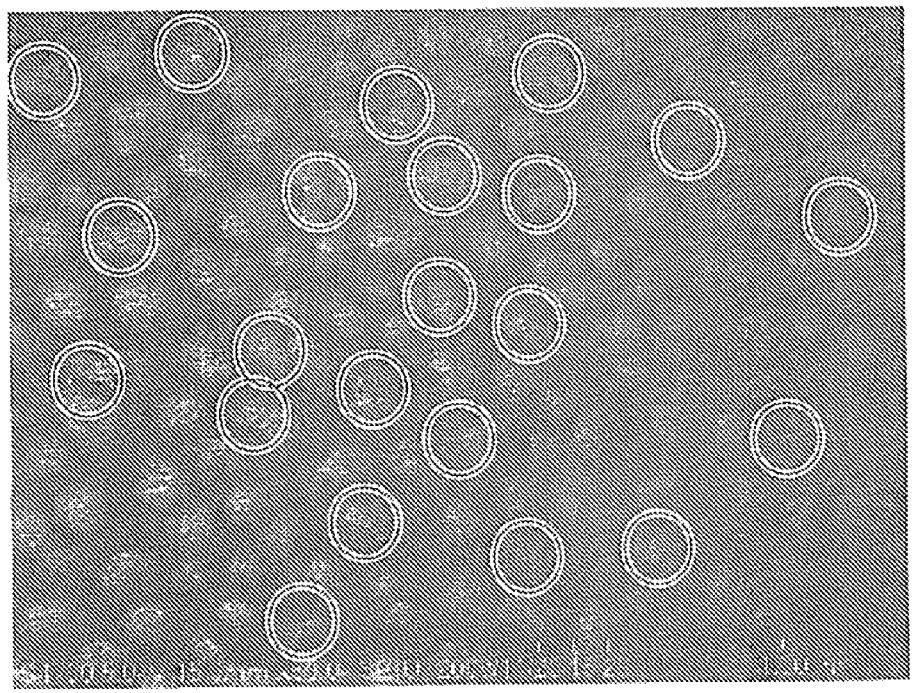
FIG. 64 is a planar photograph of the moth-eye film manufactured in Reference Example 4.
Figure 65:
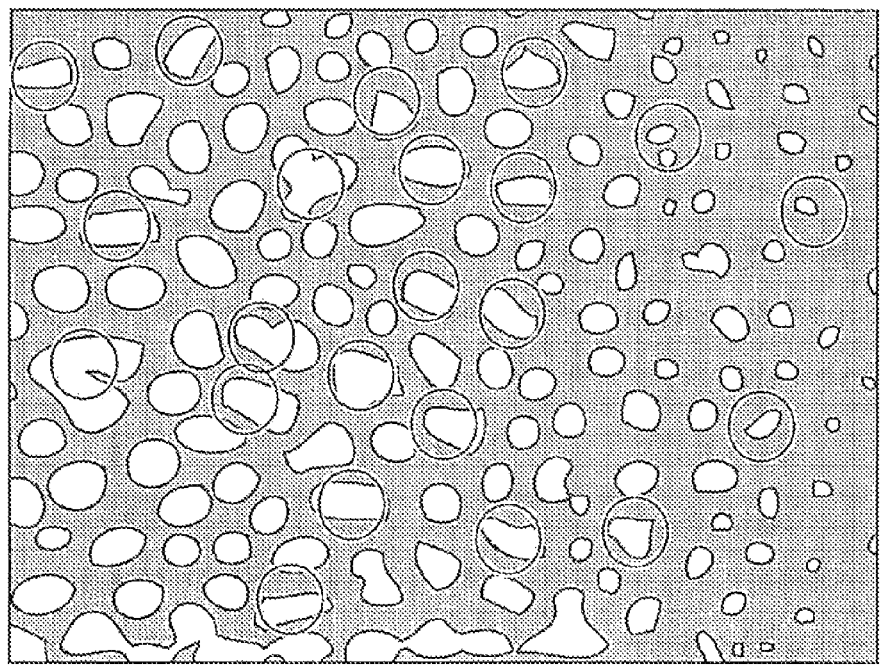
FIG. 65 is a planar schematic view of the moth-eye film manufactured in Reference Example 4.
Figure 66:
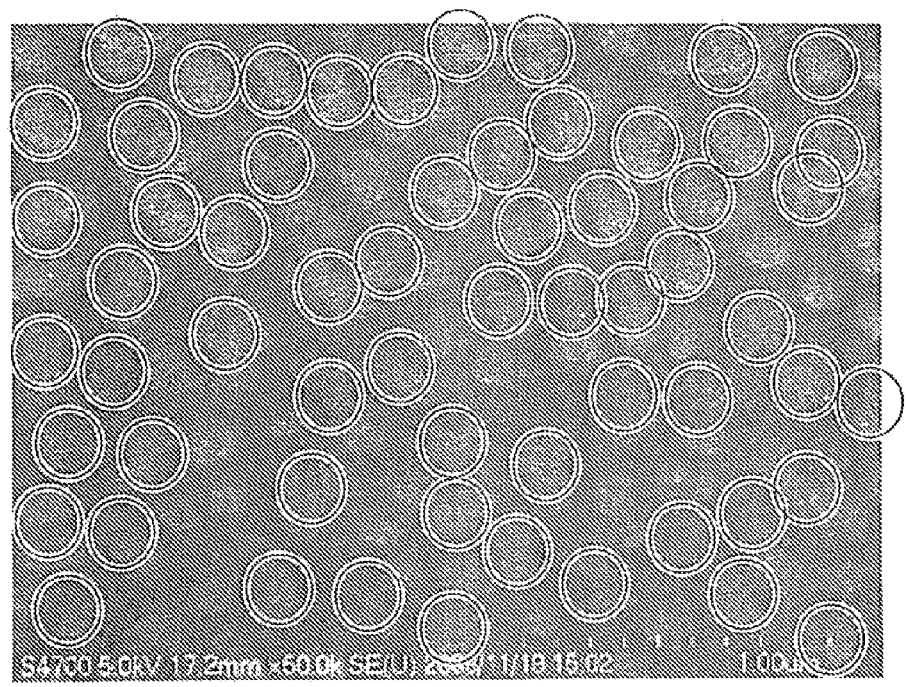
FIG. 66 is a planar photograph of the moth-eye film manufactured in Reference Example 5.
Figure 67:
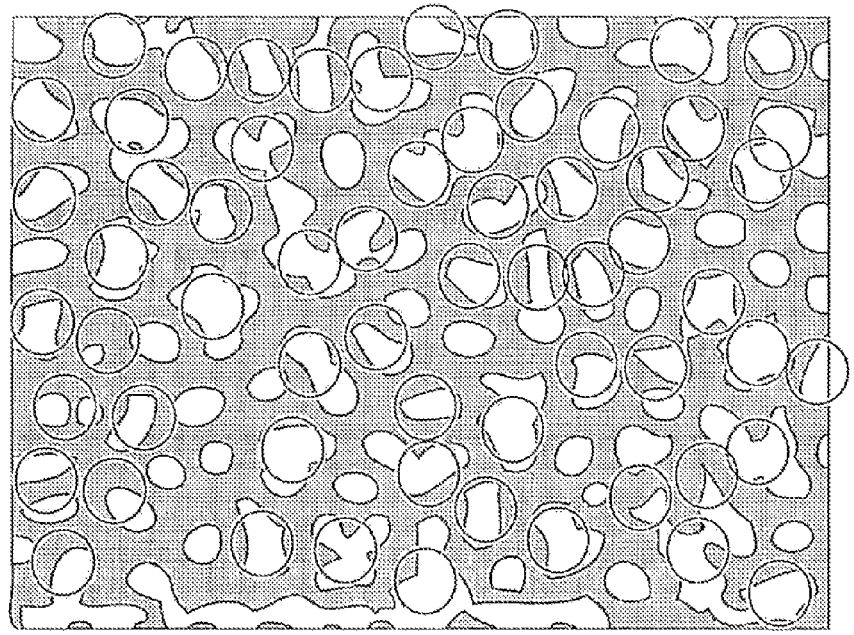
FIG. 67 is a planar schematic view of the moth-eye film manufactured in Reference Example 5.

FIGS. 64 to 67 show the moth-eye films manufactured in Reference Examples 4 and 5. FIGS. 64 and 65 correspond to Reference Example 4, and FIGS. 66 and 67 correspond to Reference Example 5. Parts surrounded by circles in FIGS. 64 to 67 indicate sticking structures having a diameter of at least 0.3 μm, formed when the tip end portions of the convex portions are joined to each other. The density of the number of sticking structures was $4.5/\mu m^2$ in the moth-eye film shown in FIGS. 64 and 65, and $12.6/\mu m^2$ in the moth-eye film shown in FIGS. 66 and 67.

It can therefore be seen that sticking structures were formed such that light scattering was caused by the sticking structures in all of the moth-eye films formed from the resins A to D using the mold 4.

Table 2 summarizes relationships between combinations of the molds 1 to 4 and the resins A to D and the respective examples and reference examples. Further, Table 3 summarizes evaluations of a sense of clarity observed visually by an observer when the combinations of the molds 1 to 4 and the resins A to D were disposed on a transparent substrate in an atmosphere having a peripheral lightness of 20000 Lx (corresponding to a cloudy afternoon outdoors).

TABLE 2

|  | Mold 1 | Mold 2 | Mold 3 | Mold 4 |
| --- | --- | --- | --- | --- |
| Resin A | Example 4 | Example 8 | Example 12 | Reference Example 4 |
| Resin B | Example 5 | Example 9 | Reference Example 3 | Reference Example 5 |
| Resin C | Example 6 | Example 10 | Example 13 | Reference Example 6 |
| Resin D | Example 7 | Example 11 | Example 14 | Reference Example 7 |

TABLE 3

|  | Mold 1 | Mold 2 | Mold 3 | Mold 4 |
| --- | --- | --- | --- | --- |
| Resin A | ◎ | ◎ | ○ | X |
| Resin B | ○ | ○ | △ | X |
| Resin C | ◎ | ○ | ▲ | X |
| Resin D | ◎ | ○ | ▲ | X |

On Table 3, a double circle indicates a display on which no cloudiness was perceived at all, a circle indicates a display on which substantially no cloudiness was perceived, a black triangle indicates a display on which slight cloudiness within an allowable range was perceived, a white triangle indicates a display on which unfavorable cloudiness was perceived, and an x indicates a defective display on which cloudiness was perceived.

According to these results, cloudiness was likely to be perceived during actual viewing with the moth-eye films of Reference Examples 3 to 7, which exhibited high radiance. With the moth-eye films of Examples 4 to 14, which exhibited low radiance, on the other hand, it was possible to obtain a clear display on which cloudiness was unlikely to be perceived during actual viewing.

Table 4 summarizes brightness (Y value) increases (cd/m$^2$) generated by the light scattered on the surfaces of the moth-eye films formed from the combinations of the molds 1 to 4 and the resins A to D. Further, FIG. 68 is a bar graph summarizing the brightness (Y value) increases (cd/m$^2$) caused by light scattering on the surfaces of moth-eye films formed from the combinations of the molds 1 to 4 and the resins A to D.

TABLE 4

|  | Mold 1 | Mold 2 | Mold 3 | Mold 4 |
| --- | --- | --- | --- | --- |
| Resin A | 0.0871 | 0.0257 | 0.304 | 1.56 |
| Resin B | 0.0782 | 0.141 | 1.11 | 3.77 |
| Resin C | 0.159 | 0.225 | 0.720 | 2.32 |
| Resin D | 0.0509 | 0.285 | 0.652 | 2.01 |

Figure 68:
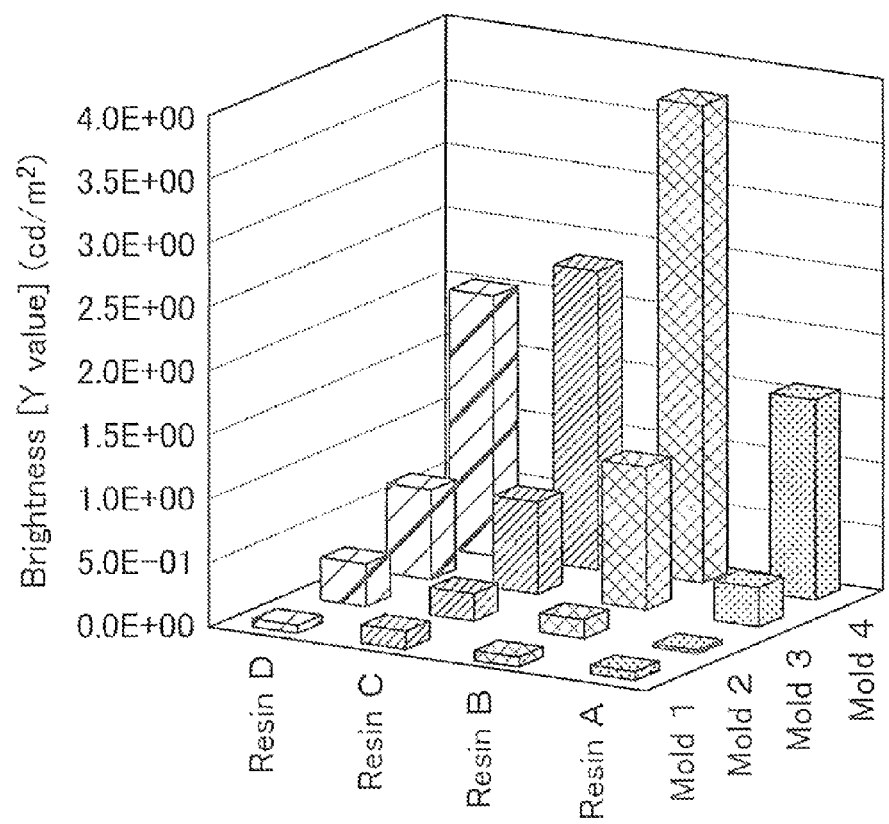
FIG. 68 is a bar graph summarizing brightness (Y value) increases generated by light scattered on the surfaces of moth-eye films formed from combinations of molds 1 to 4 and the resins A to D.

As is evident from Table 4 and FIG. 68, when the brightness (Y value) increase caused by light scattering on the surface of the moth-eye film is at least 1.11 (cd/m$^2$), corresponding to Reference Example 3, cloudiness occurs such that a favorable display is not obtained. As long as the brightness (Y value) increase is no greater than 0.652 (cd/m$^2$), corresponding to Example 14, on the other hand, cloudiness is unlikely to be perceived, and therefore a favorable display is obtained.

Figure 69:
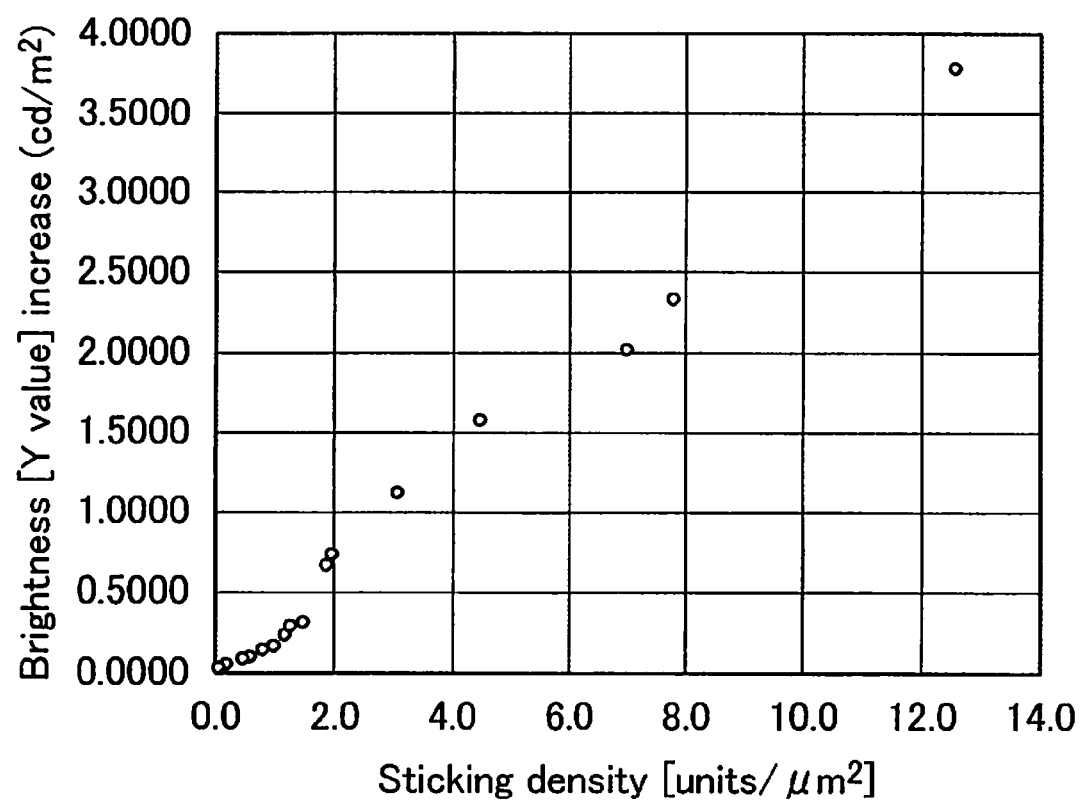
FIG. 69 is a graph showing a correlative relationship between a sticking density (units/μm$^2$) and the brightness (Y value) increase.

Table 5 summarizes the sticking density (units/μm$^2$) with respect to the combinations of the molds 1 to 4 and the resins A to D. Further, FIG. 69 is a graph showing a correlative relationship between the sticking density (units/μm$^2$) and the brightness (Y value) increase.

TABLE 5

|  | Mold 1 | Mold 2 | Mold 3 | Mold 4 |
| --- | --- | --- | --- | --- |
| Resin A | 0.6 | 0.1 | 1.5 | 4.5 |
| Resin B | 0.5 | 0.8 | 3.1 | 12.6 |
| Resin C | 1.0 | 1.2 | 2.0 | 7.8 |
| Resin D | 0.2 | 1.3 | 1.9 | 7.0 |

As is evident from Table 5, when the sticking density (units/μm$^2$) formed on the surface of the moth-eye film is at least 3.1 (units/μm$^2$), corresponding to Reference Example 3, cloudiness occurs such that a favorable display is not obtained. As long as the sticking density is no greater than 1.9 (units/μm$^2$), corresponding to Example 14, on the other hand, cloudiness is unlikely to be perceived, and therefore a favorable display is obtained. Further, it is evident from FIG. 69 that the brightness (the Y value) increases as the sticking density increases.

Acrylate UV-curable monomers or oligomers may be used as is as the resins A to D employed in the first embodiment. Alternatively, a plurality of types of acrylate UV-curable monomer or oligomer resins may be combined appropriately through copolymerization or the like in consideration of properties such as hardness, flexibility, hardening ability, and adhesiveness. By combining a plurality of types of resins, the glass transition temperature (Tg), dynamic storage elastic modulus (E'), and dynamic loss elastic modulus (E") of the employed resins can be adjusted.

For example, when a resin having a rigid skeleton such as bisphenol-A is introduced, the glass transition temperature (Tg) and the dynamic storage elastic modulus (E') increase. When a resin having a flexible skeleton such as polyethylene glycol is introduced, on the other hand, the glass transition temperature (Tg) and the dynamic storage elastic modulus (E') decrease.

The glass transition temperature Tg, the dynamic storage elastic modulus E', the dynamic loss elastic modulus E", a breaking elongation, and so on can also be adjusted using a plasticizer, a cross-linking agent, and so on. In the case of a plasticizer, adjustments can be made in accordance with the type and added amount thereof. As the amount of plasticizer increases, the glass transition temperature Tg, dynamic storage elastic modulus E', and dynamic loss elastic modulus E" decrease, leading to an increase in the breaking elongation. In the case of the cross-linking agent, as the added amount or a degree of cross-linking progression thereof increases, the glass transition temperature Tg, dynamic storage elastic modulus E', and dynamic loss elastic modulus E" increase, leading to an a reduction in the breaking elongation. Hence, by adding the plasticizer and the cross-linking agent appropriately, adjustments can be made to satisfy a target range of conditions.

A monofunctional acrylate monomer, a bifunctional acrylate monomer, and a multifunctional acrylate monomer may be cited as acrylate monomers that can be used in the antireflection film according to the first embodiment.

An aliphatic acrylate monomer, an alicyclic acrylate monomer, an ether-based acrylate monomer, acyclic ether-based acrylate monomer, an acrylate monomer containing a hydroxyl group, an aromatic acrylate monomer, an acrylate monomer containing carboxy, and so on may be cited as examples of the monofunctional acrylate monomer.

When monofunctional acrylate monomers having identical molecular weights are compared, Tg tends to increase in sequence from an aliphatic type (linear), an aliphatic type (branching), an alicyclic type, and an aromatic type. In an aliphatic type, Tg is lowest when a carbon number of ester groups is any of 8 to 10, and increases as the carbon number increases. In a fluorine-containing acrylate monomer, Tg takes a minimum value when the carbon number of ester groups is any of 8 to 10. In a resin formed from a monofunctional acrylate monomer, Tg can be adjusted within a range of −80° C. to 150° C.

A hardened material containing a bifunctional acrylate monomer has a comparatively high hardness. When a bifunctional acrylate monomer is used, Tg of the resin can be adjusted within a range of −30° C. to 200° C.

A multifunctional acrylate monomer exhibits a superior hardening ability, and a hardened material containing a multifunctional acrylate monomer has a high hardness. When a multifunctional acrylate monomer is used, Tg of the resin can be adjusted within a range of 80° C. to 250° C.

Acrylate oligomers can be broadly divided according to a molecular structure thereof into epoxy acrylate oligomers, urethane acrylate oligomers, and polyester acrylate oligomers.

A hardened material containing an epoxy acrylate oligomer has a high hardness and exhibits superior heat resistance and chemical resistance. When an epoxy acrylate oligomer is used, Tg of the resin can be adjusted within a range of 80° C. to 250° C.

A hardened material containing a urethane acrylate oligomer typically exhibits superior strength and expansion properties, and also possesses flexibility. When a urethane acrylate oligomer is used, Tg of the resin can be adjusted within a range of −50° C. to 80° C.

Hardened materials containing a polyester acrylate oligomer cover a wide range including both soft and hard materials. When a polyester acrylate oligomer is used, Tg of the resin can be adjusted within a range of 20° C. to 100° C.

A silicon acrylate oligomer or the like that adds weather resistance, wear resistance, water repellency, and flexibility to the characteristics when added to a polybutadiene acrylate oligomer having toughness or another oligomer may also be used.

The present application claims priority to Patent Application No. 2009-141130 filed in Japan on Jun. 12, 2009 under the Paris Convention and provisions of national law in a designated State, the entire contents of which are hereby incorporated by reference.

EXPLANATION OF REFERENCE NUMERALS

| | |
|---|---|
| 11, 22: | moth-eye film |
| 12: | convex portion |
| 13: | backing portion |
| 14: | tip end portion |
| 15: | sticking structure |
| 16: | base |
| 21: | transparent acrylic plate (base) |
| 23: | test subject |
| 24: | light source |
| 25: | brightness gauge |
| 26, 27: | absorber |

The invention claimed is:

1. An antireflection film comprising, on a surface thereof, a moth-eye structure including a plurality of convex portions such that a width between vertices of adjacent convex portions is no greater than a wavelength of visible light,
wherein the moth-eye structure includes a sticking structure formed when tip end portions of the convex portions are joined to each other,
a diameter of the sticking structure is equal to or greater than 0.3 μm, and
a density of the number of sticking structures relative to a planar area of the antireflection film is lower than 2.1 units/μm².

2. The antireflection film according to claim 1, wherein an aspect ratio of each of the plurality of convex portions is smaller than 1.0.

3. The antireflection film according to claim 1, wherein a height of each of the plurality of convex portions is smaller than 200 nm.

4. The antireflection film according to claim 1, wherein that an aspect ratio of each of the plurality of convex portions is equal to or greater than 0.8.

5. The antireflection film according to claim 1, wherein a height of each of the plurality of convex portions is equal to or greater than 160 nm.

6. The antireflection film according to claim 1, wherein a local maximum value on a curve representing a temperature dependency characteristic of a tan δ of a material forming the antireflection film is no greater than 0.4.

7. The antireflection film according to claim 6, wherein an aspect ratio of each of the plurality of convex portions is no smaller than 0.7 and no greater than 1.1.

8. The antireflection film according to claim 6, wherein a height of each of the plurality of convex portions is no smaller than 140 nm and no greater than 220 nm.

9. The antireflection film according to claim 6, wherein an aspect ratio of each of the plurality of convex portions is no smaller than 0.9 and no greater than 1.1.

10. The antireflection film according to claim 6, wherein a height of each of the plurality of convex portions is no smaller than 180 nm and no greater than 220 nm.

11. The antireflection film according to claim 1, wherein a local maximum value on a curve representing a temperature dependency characteristic of a tan δ of a material forming the antireflection film is no greater than 0.3.

12. The antireflection film according to claim 1, wherein a half width of a local maximum value on a curve representing a temperature dependency characteristic of a tan δ of a material forming the antireflection film is no smaller than 52° C.

13. The antireflection film according to claim 12, wherein an aspect ratio of each of the plurality of convex portions is no smaller than 0.7 and no greater than 1.1.

14. The antireflection film according to claim 12, wherein a height of each of the plurality of convex portions is no smaller than 140 nm and no greater than 220 nm.

15. The antireflection film according to claim 12, wherein an aspect ratio of each of the plurality of convex portions is no smaller than 0.9 and no greater than 1.1.

16. The antireflection film according to claim 12, wherein a height of each of the plurality of convex portions is no smaller than 180 nm and no greater than 220 nm.

17. The antireflection film according to claim 1, wherein a half width of a local maximum value on a curve representing a temperature dependency characteristic of a tan δ of a material forming the antireflection film is no smaller than 92° C.

18. The antireflection film according to claim 1, wherein a differential coefficient of a curve representing a temperature dependency characteristic of a dynamic storage elastic modulus of a material forming the antireflection film is no smaller than $-1.0 \times 10^{-8}$ within a range extending from a variation start point to a variation end point.

19. The antireflection film according to claim 18, wherein an aspect ratio of each of the plurality of convex portions is no smaller than 0.7 and no greater than 1.1.

20. The antireflection film according to claim 18, wherein a height of each of the plurality of convex portions is no smaller than 140 nm and no greater than 220 nm.

21. The antireflection film according to claim 18, wherein an aspect ratio of each of the plurality of convex portions is no smaller than 0.9 and no greater than 1.1.

22. The antireflection film according to claim 18, wherein a height of each of the plurality of convex portions is no smaller than 180 nm and no greater than 220 nm.

23. The antireflection film according to claim 18, wherein the dynamic storage elastic modulus is no smaller than 0.1 GPa at 25° C.

24. The antireflection film according to claim 1, wherein a differential coefficient of a curve representing a temperature dependency characteristic of a dynamic storage elastic modulus of a material forming the antireflection film is no smaller than $-0.8 \times 10^{-8}$ within a range extending from a variation start point to a variation end point.

25. The antireflection film according to claim 1, wherein a differential coefficient of a curve representing a temperature dependency characteristic of a dynamic storage elastic modulus of a material forming the antireflection film is no greater than $1.0 \times 10^{-8}$ within a range extending from a variation start point to a variation end point.

26. The antireflection film according to claim 1, wherein a differential coefficient of a curve representing a temperature dependency characteristic of a dynamic storage elastic modulus of a material forming the antireflection film is no greater than $0.8 \times 10^{-8}$ within a range extending from a variation start point to a variation end point.

27. The antireflection film according to claim 1, wherein a glass transition temperature of the material forming the antireflection film is lower than 200° C.

28. A display device comprising the antireflection film according to claim 1.

29. A light transmissive member comprising the antireflection film according to claim 1.

\* \* \* \* \*